United States Patent
Cottingham

(10) Patent No.: US 10,557,481 B2
(45) Date of Patent: Feb. 11, 2020

(54) HYDRAULIC SYSTEM INCLUDING A KINETIC ENERGY STORAGE DEVICE

(71) Applicant: JC Bamford Excavators Limited, Rocester, Uttoxeter (GB)

(72) Inventor: Darryl Cottingham, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 620 days.

(21) Appl. No.: 14/367,228

(22) PCT Filed: Dec. 21, 2012

(86) PCT No.: PCT/GB2012/053251
§ 371 (c)(1),
(2) Date: Jun. 19, 2014

(87) PCT Pub. No.: WO2013/093511
PCT Pub. Date: Jun. 27, 2013

(65) Prior Publication Data
US 2015/0027109 A1    Jan. 29, 2015

(30) Foreign Application Priority Data

Dec. 23, 2011 (GB) .................................. 1122221.3
Dec. 23, 2011 (GB) .................................. 1122223.9

(51) Int. Cl.
*F15B 1/02* (2006.01)
*F15B 15/08* (2006.01)

(52) U.S. Cl.
CPC ................ *F15B 1/02* (2013.01); *F15B 15/08* (2013.01)

(58) Field of Classification Search
CPC ..... E02F 9/2066; E02F 9/2095; E02F 9/2217; E02F 9/2296; F15B 1/02; F15B 21/14;
(Continued)

(56) References Cited

U.S. PATENT DOCUMENTS

| 3,485,037 A | 12/1969 | Clerk |
| 4,018,052 A * | 4/1977 | Laussermair .......... B60K 6/105 |
| | | 475/267 |

(Continued)

FOREIGN PATENT DOCUMENTS

| CN | 101382046 A | 3/2009 |
| CN | 101875296 A | 11/2010 |

(Continued)

OTHER PUBLICATIONS

American Society of Mechanical Engineers ("Graphic Symbols for Fluid Power Diagrams", 1967, New York, NY. (USAS Y32.10-1967)).*

(Continued)

*Primary Examiner* — Nathaniel E Wiehe
*Assistant Examiner* — Richard C Drake
(74) *Attorney, Agent, or Firm* — Marshall, Gerstein & Borun LLP

(57) ABSTRACT

A hydraulic system including hydraulic fluid, a hydraulic machine for pressuring the hydraulic fluid, a hydraulic circuit for delivering the hydraulic fluid to a hydraulic actuator, the hydraulic machine being configured to receive the hydraulic fluid from the hydraulic actuator and a kinetic energy storage device for storing energy in a kinetic form, the kinetic energy storage device being operably coupled to the hydraulic machine, the system being configured such that the hydraulic machine is operable to transfer energy from the hydraulic fluid received from the hydraulic actuator to the kinetic energy storage device.

20 Claims, 14 Drawing Sheets

(58) Field of Classification Search
CPC ......... B60K 6/105; B60K 6/10; B60W 10/24; B60T 13/06; Y02E 60/16; F16H 33/02
USPC .................................................. 60/413, 414
See application file for complete search history.

(56) References Cited

U.S. PATENT DOCUMENTS

| | | | | |
|---|---|---|---|---|
| 4,098,144 | A * | 7/1978 | Besel | B60K 6/105 180/165 |
| 4,233,858 | A * | 11/1980 | Rowlett | B60K 6/105 180/65.235 |
| 4,888,949 | A * | 12/1989 | Rogers | B60K 6/105 180/165 |
| 5,890,468 | A * | 4/1999 | Ozawa | F02B 37/005 123/561 |
| 6,170,587 | B1 * | 1/2001 | Bullock | B60K 6/12 180/165 |
| 6,460,332 | B1 * | 10/2002 | Maruta | E02F 9/2075 60/414 |
| 7,043,906 | B2 * | 5/2006 | Suzuki | E02F 9/2217 60/422 |
| 7,444,809 | B2 * | 11/2008 | Smith | E02F 9/2217 60/413 |
| 7,658,065 | B2 * | 2/2010 | Smith | E02F 9/2217 60/414 |
| 8,186,154 | B2 * | 5/2012 | Nelson | E02F 9/2217 60/414 |
| 8,881,519 | B2 * | 11/2014 | Kamimura | E02F 9/123 60/414 |
| 9,102,223 | B2 * | 8/2015 | Greenwood | B60K 6/105 |
| 9,300,184 | B2 * | 3/2016 | Cross | B60K 6/105 |
| 9,926,951 | B2 * | 3/2018 | Ooki | F15B 21/14 |
| 2007/0089400 | A1 | 4/2007 | Huang | |
| 2007/0175209 | A1 | 8/2007 | Smith et al. | |
| 2007/0186548 | A1 | 8/2007 | Smith et al. | |
| 2008/0210500 | A1 * | 9/2008 | Walker | B60K 6/105 188/151 R |
| 2009/0277168 | A1 | 11/2009 | Jensen | |
| 2010/0280712 | A1 * | 11/2010 | Bowman | B60K 6/105 701/36 |
| 2011/0180287 | A1 | 7/2011 | Stenzel | |
| 2012/0028752 | A1 * | 2/2012 | Van Druten | B60K 6/105 475/269 |
| 2014/0206495 | A1 * | 7/2014 | Heyse | B60K 6/105 475/331 |
| 2016/0146232 | A1 * | 5/2016 | Ooki | E02F 9/123 60/420 |

FOREIGN PATENT DOCUMENTS

| | | | |
|---|---|---|---|
| EP | 1186783 | A2 | 3/2002 |
| EP | 1 439 310 | A1 | 7/2004 |
| EP | 1703143 | A1 | 9/2006 |
| GB | 2469864 | A | 11/2010 |
| GB | 2533224 | A * | 6/2016 ............ E02F 9/2217 |
| JP | S57-203860 | A | 12/1982 |
| JP | S59221464 | A | 12/1984 |
| JP | S60-109654 | A | 6/1985 |
| JP | 2004028212 | A | 1/2004 |
| JP | 2008-138439 | A | 6/2008 |
| JP | 2010-208417 | A | 9/2010 |
| JP | 2011-127534 | A | 6/2011 |
| JP | 2011-190854 | A | 9/2011 |

OTHER PUBLICATIONS

Search Report for PCT/GB2012/053251, dated Apr. 24, 2013.
Written Opinion for PCT/GB2012/053251, dated Apr. 24, 2013.
Office Action for Chinese Patent Application No. 201280070579.8, dated Dec. 2, 2016.
Search Report for Application No. GB1122221.3, dated Mar. 20, 2012.
Search Report for Application No. GB1122223.9, dated Apr. 30, 2012.
"An Assessment of Flywheel High Power Energy Storage Technology," (2011). Retrieved from the Internet at: URL:http://www.compositesworld.com/cdn/cms/ORNL%20Flywheel%20Assessment%20for%20Hybrid%20Vehicles%202011.pdf.
"Commission Directive 2010/26/EU," Official Journal of the European Union (2010).
"Control of Emission of Air Pollution from Nonroad Diesel Engines and Fuel," Environmental Protection Agency, Federal Register, 69(124):1-13 (2004).
"Flywheel Tech—Flybird Automative" (2015). Retrieved from the Internet at: URL:http://www.flybridsystems.com/flywheeltech.html.
"Variable Axial Piston Pump (A)A10VSO," Rexroth Boscho Group (2004).
Clegg, "A Review of Regenerative Braking Systems," Working Paper, Institute of Transport Studies (1996).
Krishnan et al., "Economics of Emission Reduction for Heavy Duty Trucks," DieselNet Technical Report (2005).
Office Action issued in Japanese Patent Application No. 2014-548205, dated Jun. 27, 2017.
English-language translation of Office Action issued in Japanese Patent Application No. 2014-548205, dated Jun. 5, 2018.
Office Action for Chinese Patent Application No. 201280070579.8, dated Jan. 17, 2018.

* cited by examiner

HYDRAULIC SYSTEM INCLUDING A KINETIC ENERGY STORAGE DEVICE

FIELD OF THE INVENTION

The present invention relates to an energy recovery system, in particular for use with a load handling machine.

BACKGROUND OF THE INVENTION

Load handling machines, such as back hoe loaders, excavators and telehandlers, are known whereby material can be moved from one place to another. The material may be discreet material, for example telehandling machine may move palletised material. Alternatively the material may be loose material such as earth which could be dug using an excavator. In either case, energy is required to move the material. Under certain circumstances, kinetic energy, for example the forward motion of a load handling machine, or potential energy, for example the centre of gravity of a lifting arm above ground level, can be wasted during operation of the machine. The object of the present invention is to provide a means of recovering energy that would otherwise be wasted.

SUMMARY OF THE INVENTION

Thus, according to the present invention there is provided a hydraulic system including hydraulic fluid, a hydraulic machine for pressuring the hydraulic fluid, a hydraulic circuit for delivering the hydraulic fluid to a hydraulic actuator, the hydraulic machine being configured to receive the hydraulic fluid from the hydraulic actuator and a kinetic energy storage device for storing energy in a kinetic form, the kinetic energy storage device being operably coupled to the hydraulic machine, the system being configured such that the hydraulic machine is operable to transfer energy from the hydraulic fluid received from the hydraulic actuator to the kinetic energy storage device.

According to another aspect of the present invention there is provided a hydraulic system including hydraulic fluid, a hydraulic machine for pressurising the hydraulic fluid, hydraulic circuit for delivering the hydraulic fluid to a hydraulic actuator, the hydraulic machine being configured to selectively receive the hydraulic fluid from the hydraulic actuator and a kinetic energy storage device for storing energy in a kinetic form, the kinetic energy storage device being selectively operably coupled to the hydraulic machine, the system being configured such that the hydraulic machine is selectively operable to transfer energy from the hydraulic fluid received from the hydraulic actuator to the kinetic energy storage device.

Advantageously, energy that would otherwise be wasted can be stored in the kinetic energy storage device. The stored energy can later be used. Because the hydraulic machine is operable to transfer energy from the hydraulic fluid received from the hydraulic actuator to the kinetic energy storage device, then the kinetic energy storage device can act to resist the actuator in a controlled manner. For example, when the actuator controls the centre of gravity of a lifting arm above ground, and the kinetic energy storage device is a flywheel, by ensuring the flywheel speeds up in a controlled manner ensures that the lifting arm descends in a controlled manner. Similarly, when the actuator controls the speed of an associated vehicle across the ground, and the kinetic energy storage device is a flywheel, by ensuring the flywheel speeds up in a controlled manner ensures that the speed of the vehicle across the ground is reduced in a controlled manner.

The hydraulic machine may be a variable displacement (or variable capacity) hydraulic machine. The hydraulic machine may be a variable displacement swash plate pump/motor.

The hydraulic machine may be operable to transfer energy from the kinetic energy storage device to the hydraulic fluid.

The hydraulic machine and the hydraulic circuit may be configured to transfer energy from the kinetic energy storage device to the hydraulic actuator. Where the hydraulic actuator performs a repetitive task, such as lifting and lowering of a boom in order to load product or unload product, then recovered energy stored in a kinetic energy storage device during lowering of the boom or the like can be reused to lift or assist in lifting the boom during the next part of the repetitive task.

The hydraulic machine and the hydraulic circuit may be configured to transfer energy from the kinetic energy storage device to a further hydraulic actuator.

The kinetic energy storage device may be a flywheel. The flywheel may be a solid flywheel, i.e. a non-fluid flywheel.

The flywheel may be operably coupled to the hydraulic machine such that the flywheel rotates faster than the hydraulic machine.

The flywheel may be operably coupled to the hydraulic machine such that the flywheel rotates at least 5 times faster than the hydraulic machine or at least ten times faster than the hydraulic machine.

The flywheel may rotate at at least 20,000 rpm (revs per minute).

The actuator may be a linear actuator or a rotary actuator.

The kinetic energy storage device may be operably coupled to the hydraulic machine via a clutch which is selectively operable to prevent transfer of energy from the hydraulic machine to the kinetic energy storage device.

The kinetic energy storage device may be operably coupled to the hydraulic machine by a clutch which is selectively operable to prevent transfer of energy from the kinetic energy storage device to the hydraulic machine.

The hydraulic machine may be defined by a first hydraulic machine for pressuring the hydraulic fluid and a second hydraulic machine being configured to receive the hydraulic fluid from the actuator, and the kinetic energy storage device is operably coupled to the second hydraulic machine, the system being configured such that the second hydraulic machine is operable to transfer energy from the hydraulic fluid received from the hydraulic actuator to the kinetic energy storage device.

The hydraulic machine may be defined by a first hydraulic machine for pressurising the hydraulic fluid and a second hydraulic machine being configured to selectively receive the hydraulic fluid from the actuator and the kinetic energy storage device is selectively operably coupled to the second hydraulic machine, the system being configured such that the second hydraulic machine is selectively operable to transfer energy from the hydraulic fluid received from the hydraulic actuator to the kinetic energy storage device.

The first hydraulic machine may be a variable displacement hydraulic machine. The first hydraulic machine may be a variable displacement swash plate pump/motor.

The first hydraulic machine may be configured to be mechanically driven by a prime mover. The prime mover may be an internal combustion engine. The internal combustion engine may be a spark ignition internal combustion engine. The internal combustion engine may be a compression ignition internal combustion engine. The first hydraulic machine may be driven at the same speed as the prime mover. The first hydraulic machine may be driven at a faster speed than the prime mover.

The second hydraulic machine may be configured to be mechanically driven only by the kinetic energy storage device. The second hydraulic machine may be a variable displacement hydraulic machine. The second hydraulic machine may be a variable displacement swash plate pump/motor.

The hydraulic actuator may be operable to raise a lifting arm.

The hydraulic actuator may be operable to slow one part of the vehicle relative to another part of the vehicle.

A vehicle may include a hydraulic system as defined above and the vehicle may include ground engaging means for propelling the vehicle, the hydraulic actuator being operable to drive the ground engaging means.

According to a further aspect of the invention there is provided a method of operating a vehicle including a hydraulic system as defined above including operating the actuator so as to reduce the potential energy of the vehicle or a part of the vehicle and storing at least some of the potential energy as kinetic energy in the kinetic energy storage device.

According to a further aspect of the invention there is provided a method of operating a vehicle including a hydraulic system as defined above by operating the actuator so as to reduce the kinetic energy of the vehicle or a part of the vehicle and storing at least some of the kinetic energy as kinetic energy in the kinetic energy storage device.

The vehicle may include a first part rotatable about a substantially vertical axis relative to a second part, the method including the step of operating the actuator so as to reduce the kinetic energy of the first part relative to the second part.

According to a further aspect of the present invention there is provided a method of operating a vehicle including a hydraulic system as defined above including operating a prime mover of the vehicle so as to generate energy and storing at least some of the energy as kinetic energy in the kinetic energy storage device.

The vehicle may be a materials handling vehicle.

According to a further aspect of the invention there is provided a method of operating an internal combustion engine including the steps of providing an internal combustion engine having an exhaust after treatment system, providing a hydraulic system as defined above and, starting with the exhaust after treatment system that a temperature below a normal working temperature, starting the internal combustion engine and using the kinetic energy storage device to apply a load to the engine so as to store energy in the kinetic energy storage device and increase the temperature of the exhaust after treatment system.

According to a further aspect of the present invention there is provided a method of operating an internal combustion engine including the steps of providing an internal combustion engine having an exhaust after treatment system, providing a kinetic energy storage device for storing energy in a kinetic form and starting with the exhaust after treatment system at a temperature below a normal working temperature, starting internal combustion engine and using the kinetic energy storage device to apply a load to the engine so as to store kinetic energy in the kinetic energy storage device and increase the temperature of the exhaust after treatment system.

The kinetic energy storage device may be a flywheel. The flywheel may be a solid flywheel, i.e. a non-fluid flywheel.

The flywheel may be operably coupled to the internal combustion engine such that the flywheel rotates faster than the internal combustion engine.

The flywheel may rotate at least 5 times faster than the internal combustion engine or at least ten times faster than the internal combustion engine.

The flywheel may rotate at at least 20,000 rpm (revs per minute).

The exhaust after treatment system may be at least one of a diesel oxidation catalyst, a selective catalytic reducer, a $NO_x$ absorber, a lean $NO_x$ trap, a three way catalyst and a diesel particulate filter.

The internal combustion engine may be one of a compression ignition engine or a spark ignition engine.

A clutch may be selectively operable to prevent transfer of energy from the internal combustion engine to the kinetic energy storage device.

A clutch may be selectively operable to prevent transfer of energy from the kinetic energy storage device to the internal combustion engine.

Immediately prior to starting the internal combustion engine the kinetic energy storage device may not be storing any energy.

Stored energy may subsequently be transferred from the kinetic energy storage device to the internal combustion engine.

Stored energy may subsequently be transferred from the kinetic energy storage device to a hydraulic service and/or to ground engaging means.

A step of subsequently transferring stored energy from the kinetic energy storage device may be achieved without transferring the energy through the engine.

The internal combustion engine may be installed in a vehicle, preferably in a material handling machine.

According to a further aspect of the invention there is provided a method of operating a vehicle as defined above including the steps of providing an internal combustion engine having an exhaust after treatment system and, starting with the exhaust after treatment system that a temperature below a normal working temperature, starting the internal combustion engine and using the kinetic energy storage device to apply a load to the engine so as to store energy in the kinetic energy storage device and increase the temperature of the exhaust after treatment system.

According to a further aspect of the invention there is provided a method of operating a vehicle including a hydraulic system as defined above including the steps of:
a) arranging the hydraulic actuator to provide pressurised hydraulic fluid,
b) driving the hydraulic machine with the pressurised hydraulic fluid,
c) transferring energy from the hydraulic machine to the kinetic energy storage device,
d) storing kinetic energy in the kinetic energy storage device for a period of time.

According to a further aspect of the invention there is provided a method of operating a vehicle including a hydraulic system as defined above including the steps of:
a) selectively arranging the hydraulic actuator to provide pressurised hydraulic fluid,
b) selectively driving the hydraulic machine with the pressurised hydraulic fluid,
c) selectively transferring energy from the hydraulic machine to the kinetic energy storage device, d) storing kinetic energy in the kinetic energy storage device for a period of time.

During step b) and/or step c) and/or step d) above, at least some of the pressurised hydraulic fluid provided by the actuator may be separately depressurised. In particular at least some of the pressurised hydraulic fluid provided by an actuator may be selectively separately depressurised. Advantageously, where not all of the energy in the pressurised hydraulic fluid from the hydraulic actuator can be transferred to the kinetic energy storage device, some of that energy can be "wasted" by being selectively separately depressurised. The at least some of the pressurised hydraulic fluid provided by the actuator may be selectively separately depressurised to zero pressure or may be selectively separately partially depressurised (i.e. depressurised to a pressure above zero).

During step c) where the hydraulic machine is a variable capacity hydraulic machine the displacement capacity of the hydraulic machine may be decreased, in particular may be progressively decreased during step c).

During step c) above at least some of the pressurised hydraulic fluid provided by the actuator may be separately depressurised including modulating (or varying) the separate depressurisation of the at least some of the pressurised hydraulic fluid. By modulating the separate depressurisation, the hydraulic actuator can be controlled and/or the amount of energy being transferred into the kinetic energy storage device can be controlled.

The method above may include subsequently transferring energy from the kinetic energy storage device to the hydraulic machine, arranging for the hydraulic machine to pressurise the hydraulic fluid, supplying pressurised hydraulic fluid to the hydraulic actuator to enable the hydraulic actuator to do work.

The method above may include subsequently selectively transferring energy from the kinetic energy storage device to the hydraulic machine, selectively arranging for the hydraulic machine to pressurise the hydraulic fluid, selectively supplying pressurised hydraulic fluid to the hydraulic actuator to enable the hydraulic actuator to do work.

Where the hydraulic machine is a variable capacity hydraulic machine the displacement capacity of the hydraulic machine may be increased, in particular may be progressively increased during the step of subsequently transferring energy from the kinetic energy storage device to the hydraulic machine.

According to a further aspect of the present invention there is provided a method of operating a vehicle including a hydraulic system as defined above including the steps of:
arranging the hydraulic actuator to provide pressurised hydraulic fluid to drive the first hydraulic machine,
transferring energy from the first hydraulic machine to the kinetic energy storage device, and storing kinetic energy in the kinetic energy storage device for a period of time.

According to a further aspect of the present invention there is provided a method of operating a vehicle including a hydraulic system as defined above including the steps of:
selectively arranging the hydraulic actuator to provide pressurised hydraulic fluid to drive the first hydraulic machine,
selectively transferring energy from the first hydraulic machine to the kinetic energy storage device, and
selectively storing kinetic energy in the kinetic energy storage device for a period of time.

Where the first hydraulic machine is a variable capacity hydraulic machine the displacement capacity of the first hydraulic machine may be decreased, in particular may be progressively decreased during the step of transferring energy from the first hydraulic machine to the kinetic energy storage device.

The method may include subsequently transferring energy from a kinetic energy storage device to the first hydraulic machine,
arranging for the first hydraulic machine to pressurise the hydraulic fluid, and
supplying the pressurised hydraulic fluid from the first hydraulic machine to the hydraulic actuator to enable the hydraulic actuator to do work.

Where the hydraulic machine is a variable capacity hydraulic machine the displacement capacity of the hydraulic machine may be increased, in particular progressively increased during the step of subsequently transferring energy from the kinetic energy storage device to the first hydraulic machine.

The method may include arranging the second hydraulic machine to pressurise the hydraulic fluid and supplying the pressurised hydraulic fluid from the second hydraulic machine to the hydraulic actuator to enable the hydraulic actuator to do work.

The method may include simultaneously supplying pressurised hydraulic fluid from the first hydraulic machine to the hydraulic actuator and supplying pressurised hydraulic fluid from the second hydraulic machine to the hydraulic actuator. Where the first hydraulic machine is a variable capacity hydraulic machine during the step of supplying pressurised hydraulic fluid from the first hydraulic machine to the hydraulic actuator and supplying pressurised hydraulic fluid from the second hydraulic machine to the hydraulic actuator, the displacement capacity of the first hydraulic machine may be simultaneously increased, in particular simultaneously progressively increased.

The method may include modulating (or varying) the pressurised fluid supplied by the second hydraulic machine. By modulating the pressurised fluid supplied by the second hydraulic machine the hydraulic actuator can be controlled and/or the amount of energy being transferred from the kinetic energy storage device can be controlled.

The method may include modulating the pressurised fluid supplied by the second hydraulic machine by increasing the pressurised fluid supplied by the second hydraulic machine.

BRIEF DESCRIPTION OF THE DRAWINGS

The invention will now be described, by way of example only, with reference to the accompanying drawings in which.

DETAILED DESCRIPTION

Figure 1:
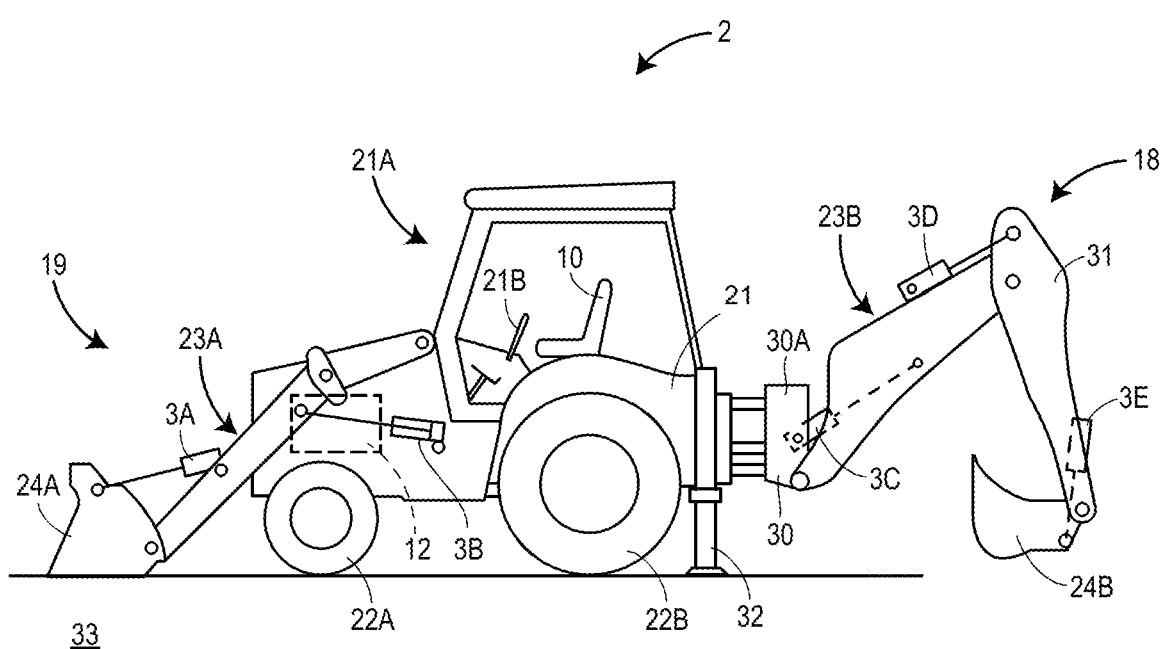
FIG. 1 is a view of a machine including hydraulic system according to the present invention.

With reference to FIG. 1 there is shown a working machine 2, in this case a back hoe loader machine. The machine includes a chassis 21 supported on front wheels 22A and rear wheels 22B. The machine includes a cab 21A and manually operable controls 21B which can be operated by an operator sitting in seat 10. Pivotally mounted on the chassis is a front loading arm 23A, on the front of which is pivotally mounted a loading shovel 24A. A carriage 30 is slideably mounted on the chassis at rear of the machine. The carriage can be caused to slide laterally relative to the chassis, i.e. towards or away from a viewer viewing FIG. 1. A back hoe arm 23B is pivotally mounted on the carriage 30. A dipper arm 31 is pivotally mounted on an end of the back hoe arm 23B. A bucket 24B is pivotally mounted on an end of the dipper arm 31. Stabilising legs 32 are extendible towards the ground 33 and engageable therewith to stabilise the chassis when the back hoe 18 is being used. The stabilising legs are retractable away from the ground 33 for example when the wheels are being used to propel the working machine across the ground.

The working machine includes an engine 12. The engine 12 drives a transmission 40 (see FIG. 2) which in turn drives the rear wheels 22B to propel the vehicle along the ground when required. The engine also drives a hydraulic pump 42 which, by virtue of a control system and a hydraulic circuit, selectively supplies pressurised hydraulic fluid to actuators 3A, 3B, 3C, 3D and 3E.

Actuator 3A is a hydraulic ram which causes the bucket 24A to pivot relative to the front loading arm 23A.

Actuator 3B is a hydraulic ram which causes the front loading arm 23A to pivot relative to the chassis 21.

Actuator 3C is a hydraulic ram which causes the back hoe arm 23B to pivot about a generally horizontal axis relative to the carriage 30.

Actuator 3D is a hydraulic ram which causes the dipper arm 31 to pivot relative to the back hoe arm 23B.

Actuator 3E is a hydraulic ram which causes the bucket 24B to pivot relative to the dipper arm 31.

Further actuators (not shown) causes extension and/or retraction of the stabilising legs.

A further actuator (not shown) causes the carriage 30 to move laterally relative to the chassis 21.

A further actuator (not shown) causes rear portion 30A of carriage 30 to "slew" relative to the chassis 21, i.e. pivot about a substantially vertical axis relative to chassis 21.

The actuators shown in FIG. 1 and the actuators just described are known as "hydraulic services" and are supplied with pressurised hydraulic fluid from the hydraulic pump 42. A person skilled in the art would readily appreciate that other types of hydraulic services are known.

Figure 2:
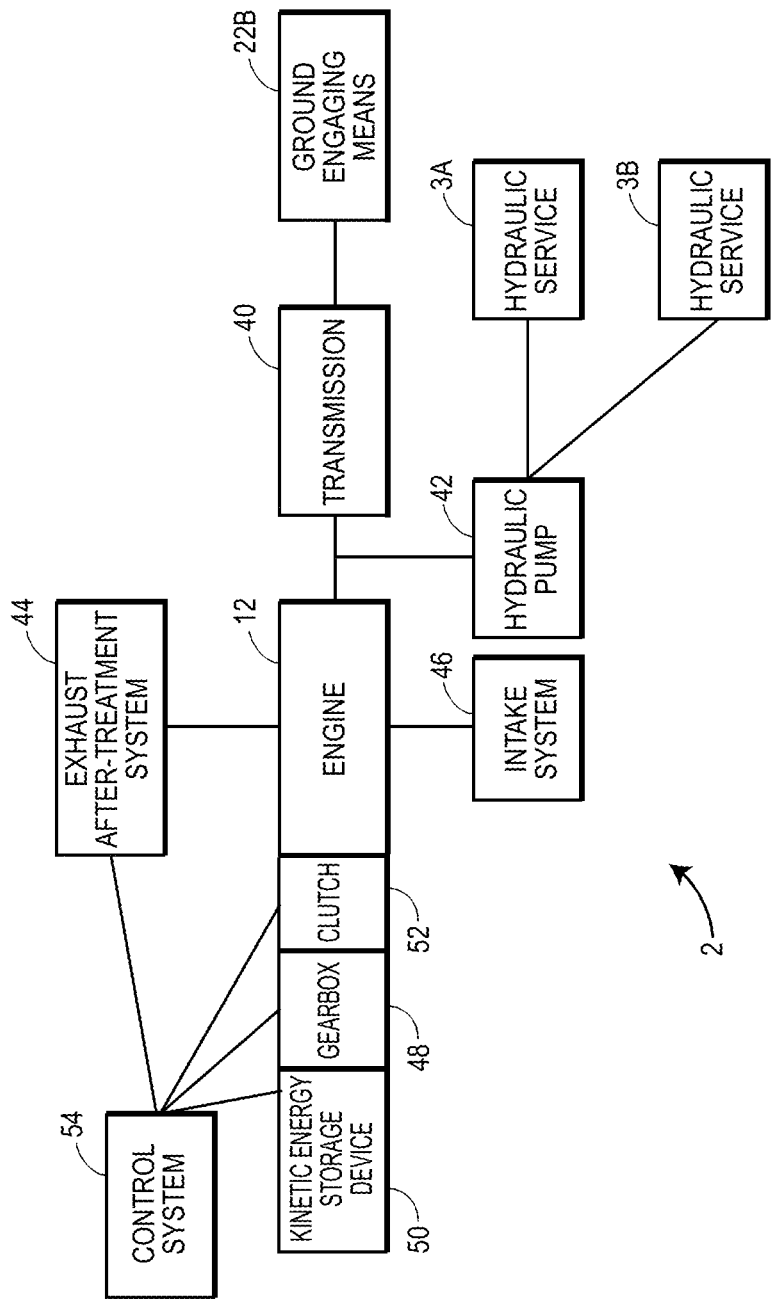
FIG. 2 is a schematic representation of the machine of FIG. 1.

Referring to FIG. 2 there is shown a schematic diagram of a working machine including an engine according to the present invention. The engine includes an after treatment system 44 and an intake system 46, the principal operation of an engine with an intake system and exhaust after treatment system is known, but in summary air from the atmosphere passes through the intake system and into the engine. Fuel is injected either directly into the engine or into the intake system where it then passes with the air into the engine. The fuel air mixture is combusted to rotate a crank shaft or the like and exhaust products pass into the exhaust after treatment system. Depending upon the type of engine (in particular a compression ignition engine or a spark ignition engine) then the exhaust after treatment system 44 will be arranged to prevent toxic exhaust products from entering the atmosphere. Examples of exhaust after treatment systems include a diesel oxidation catalyst, a selective catalytic reducer, a $NO_x$ absorber, a lean $NO_x$ trap, a three way catalyst or a diesel particulate filter.

The working machine also includes a gearbox 48, and a kinetic energy storage device 50. In this case the kinetic energy storage device is a flywheel and is therefore capable of storing energy in a kinetic form i.e. when the flywheel is rotating the rotating mass of the flywheel stores energy in a kinetic form (this can be contrasted with an electric cell of a battery which stores energy in a chemical form). A clutch 52 selectively operable to couple an engine output shaft (such as crank shaft) to an input of the step up gearbox 48. The gearbox 48 has an output which is capable of driving the flywheel. Operation of the working machine 2 is as follows.

Consider the scenario where the machine 2 has been left, inoperative, over night and the operator wishes to use the machine. Because the machine has been left inoperative for several hours, it will be at an ambient temperature of the atmosphere, and in particular the exhaust after treatment system will be at an ambient temperature of the atmosphere. Furthermore, the flywheel 50 will be stationary.

In order to use the machine the operator will enter the cab, sit on seat 10 and then start the engine. Exhaust gases will pass from the engine through the exhaust after treatment system thereby starting to warm the exhaust after treatment system. However, in the present invention a control system 54 causes the clutch 52 to engage thereby putting the engine under an extra load since with clutch 52 engaged the engine drives the gearbox 54 which in turn causes the flywheel 50 to rotate. Clearly, in order for the flywheel to start to rotate it is necessary to put some energy into the flywheel and this energy comes directly from the engine. Because the engine must generate more power than otherwise would have to, it also generates more heat and this extra heat in the exhaust gases passes into the exhaust after treatment system and hence the exhaust after treatment system heats up faster than it otherwise would. The engine and the exhaust after treatment system will ultimately reach a normal working temperature, at which time the flywheel 50 will be spinning and hence will be storing kinetic energy. This kinetic energy is then available to be used at an appropriate time.

As shown in FIG. 2, the clutch 52 can be disengaged and the flywheel 50 will remain spinning at a relatively high speed whilst the speed of the engine may then be allowed to fall. In the event that it is subsequently necessary to increase the speed of the engine to produce more power, then the control system 54 can selectively engage the clutch 52 thereby causing the flywheel to reduce in speed and transfer energy from the flywheel to the engine which, then, increases in speed. Thus, depending upon the particular circumstances, the kinetic energy in the flywheel can be transferred via the engine through the transmission 14 to the rear wheels 22B to assist in propelling the machine 2 over the ground. Alternatively, the energy stored in the flywheel 50 can be transferred by the engine to the hydraulic pump 42 so as to assist in operating a hydraulic service.

Figure 3:
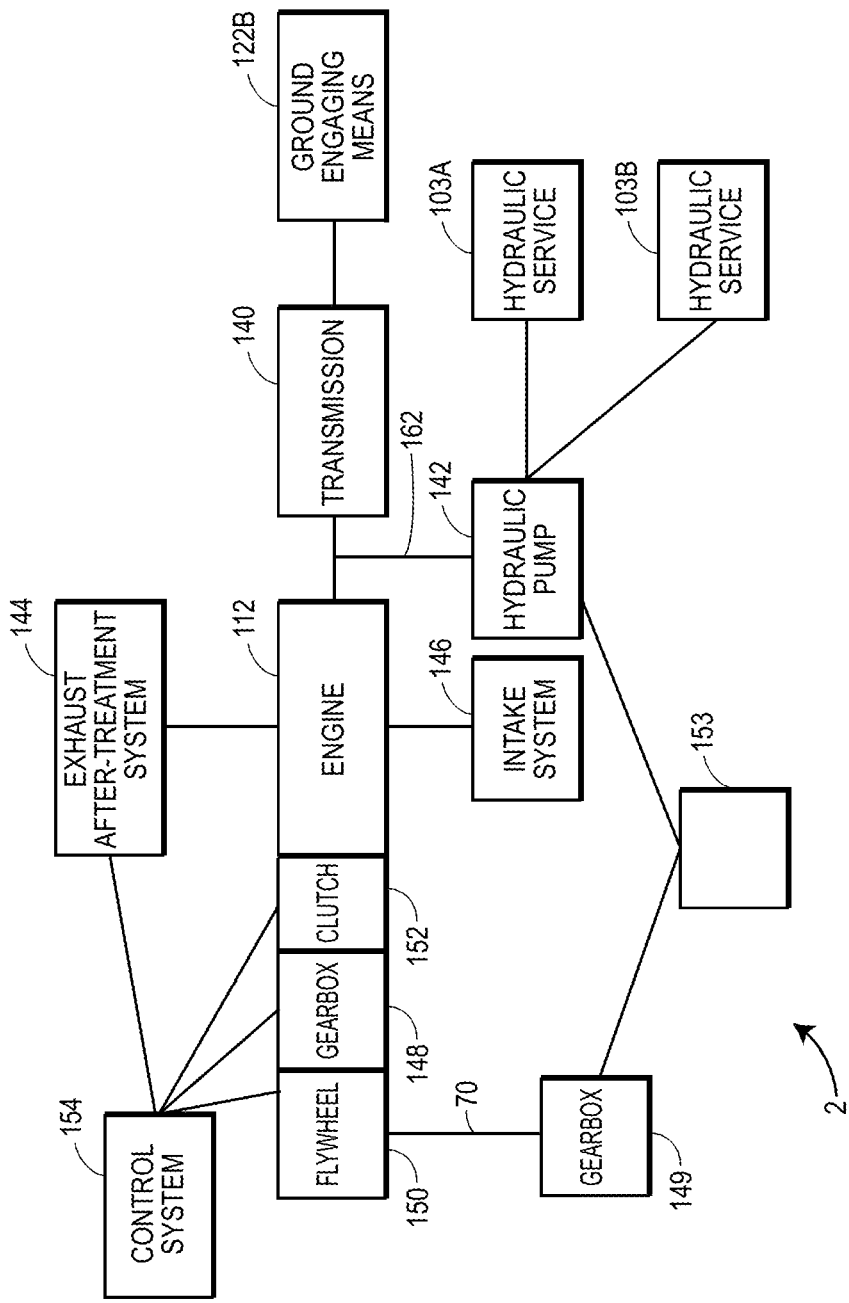
FIG. 3 is a schematic representation of an alternative machine including a hydraulic system according to the present invention.

As shown in FIG. 2 the engine can transfer energy to the flywheel and the flywheel can transfer energy to the engine. In further embodiments, in addition to the flywheel being driven by the engine, the flywheel may also be driven by other sources of energy. Furthermore, in further embodiments the flywheel may transfer energy to alternative energy absorbers without that energy passing through the engine. Thus with reference to FIG. 3 there is shown a further embodiment of a working machine 102 with components that fulfil the same function as those components of working machine 2 being labelled 100 greater. A comparison between FIGS. 2 and 3 shows that the only difference between working machine 2 and working machine 102 is that working machine 102 includes a further gearbox 149 and a further clutch 153 and associated mechanical drive parts 70, 71 and 72. Thus, once the engine 112 has been started and the engine and exhaust after treatment system are at a working temperature and the flywheel 150 is spinning with the clutch 152 disengaged and the clutch 153 disengaged, then energy from the flywheel 150 can be transferred via the gearbox 149 and the clutch 153 to the hydraulic pump to power the hydraulic pump 142 or assist (in conjunction with mechanical drive path 162 coming from engine 112) in driving the hydraulic pump which in turn can supply pressurised fluid to the hydraulic services (only two of which are shown in FIG. 3).

Note that energy can be transferred from the hydraulic pump 142 via clutch 153 and gearbox 149 to the kinetic energy storage device 150 in order to store energy in the kinetic energy storage device.

Gearbox 148 is arranged such that the flywheel rotates faster than the engine when the clutch 152 is engaged. Gearbox 148 is therefore a step up gearbox when considering the transfer of energy from the engine to the flywheel. Gearbox 48 may be arranged to drive the flywheel at a speed which is at least 10 times faster than that of the engine speed.

Gearbox 149 may be arranged to drive the hydraulic pump at a slower speed than the speed at which the flywheel 150 is spinning. In one embodiment gearbox 149 is a step down gearbox when considering the transfer of energy from flywheel 150 to the hydraulic pump 142.

In a further embodiment the clutch 152 and gearbox 148 of working machine 102 could be transposed, i.e. the engine 112 could drive the gearbox 148 which in turn would drive the clutch 152 which in turn would drive the flywheel 150. Similarly the clutch 153 and gearbox 149 of working machine 102 could be transposed, i.e. the flywheel 150 could drive the clutch 153 which would drive the gearbox 149 which would drive the hydraulic pump 142.

In a further embodiment the clutch 52 and gearbox 48 of working machine 2 could be transposed.

As mentioned above the kinetic energy storage device may be a flywheel. The flywheel may run in an evacuated chamber or in a partially evacuated chamber so as to reduce friction and windage losses. In use, the flywheel may rotate faster than 20,000 revolutions per minute (RPM). In another embodiment in use the flywheel may rotate faster than 40,000 RPM or alternatively faster than 60,000 RPM.

One or more of gearboxes 48, 148 and 149 may be a continuously variable transmission (CVT) type of gearbox. The CVT gearbox may include a range change part in series with the CVT part in order to increase the working range of rotational speeds of a flywheel of the kinetic energy storage device.

With reference to FIGS. 4 to 7 there is shown a further embodiment of a working machine 202 with components that fulfil the same function as those components of working machine 102 being labelled 100 greater. The working machine 202 includes hydraulic tanks 280, 281 and 282, a control valve 283 and hydraulic lines 284, 285, 286, 287, 288, 289, 290, 291, 292, 293, 294, 295, 296, 297 and 298. In this case there are two hydraulic pumps (or hydraulic machines) 242A and 242B.

Hydraulic couplings/valves 273, 274, 275, 276, 277, 278 and 279 connect the various components. A control system 254 is connected to the control valve and also has other connections (not shown) with other parts of the system in order to ensure the correct operation of the hydraulic system.

For ease of understanding, only one service 203B has been shown on FIGS. 4 to 7.

The hydraulic pump 242 B is a variable displacement pump. Gearbox 248 is arranged such that the kinetic energy storage device 250 rotates faster than pump 242B.

The kinetic energy storage device 250 is arranged to recover energy from the service 203B (and any other services that it may be connected to) where that energy would otherwise be wasted.

Thus, consideration of FIG. 1 shows that service 203B is the equivalent of actuator ram 3B which causes the front loading arm 23A to pivot relative to the chassis 21. The extension of ram 3B causes lifting of the front loading arm 23A and retraction of hydraulic ram 3B causes lowering of the loading arm 23A. Clearly, lifting of the loading arm 23A requires energy input from the engine 12, whereas typically lowering of the loading arm 23A does not, since the loading arm will fall under the influence of gravity from a raised position to a lowered position.

Similarly, crowding of the bucket 24A requires energy input into service 3A, whereas dumping of the bucket typically does not, since the bucket will dump under the influence of gravity.

The lifting of the back hoe arm 23B requires energy whereas lowering typically does not. Lifting of the dipper arm 31 requires energy whereas lowering of the dipper arm typically does not. Crowding of the bucket 24B typically requires energy, whereas dumping of the bucket 24B typically does not. Lowering of the stabilising legs 32 requires energy, but, for example, where the rear wheels have been lifted off the ground, raising of the stabilising legs 32 to the point where the weight of the machine is taken on the rear wheels does not.

As will be appreciated, energy input is required into certain actuators when they are operated in certain directions but when operated in an opposite direction (or sense) then, under many circumstances energy input is not required since movement of the associated component is assisted by gravity. In particular, when the front loading arm is lowered from a relatively high position to a relatively low position, the centre of gravity of that lifting arm moves from a relatively high position to a relatively low position. In prior art working machines this energy is dissipated as heat within the hydraulic system. However, in the present invention this potential energy can be recovered.

As mentioned above, an actuator (not shown) causes a rear portion 30A of carriage 32 to slew relative to the chassis 21. Since the back hoe arm, dipper arm and bucket are all attached to the rear portion 30A of the carriage, then these components also slew relative to the chassis. In order to start the slew motion, energy is required to overcome the inertia of the slewed components. However, in order to stop the slew motion in a controlled manner, in the prior art this is carried out by dissipating the kinetic energy as heat within the hydraulic system. The present invention allows recovery of the kinetic slew energy.

Some working machines have a hydrostatic transmission to propel them along the ground and when it is necessary to slow the vehicle, the kinetic energy of the vehicle is dissipated as heat energy within the friction brakes. The present invention allows recovery of this kinetic energy.

Figure 4:
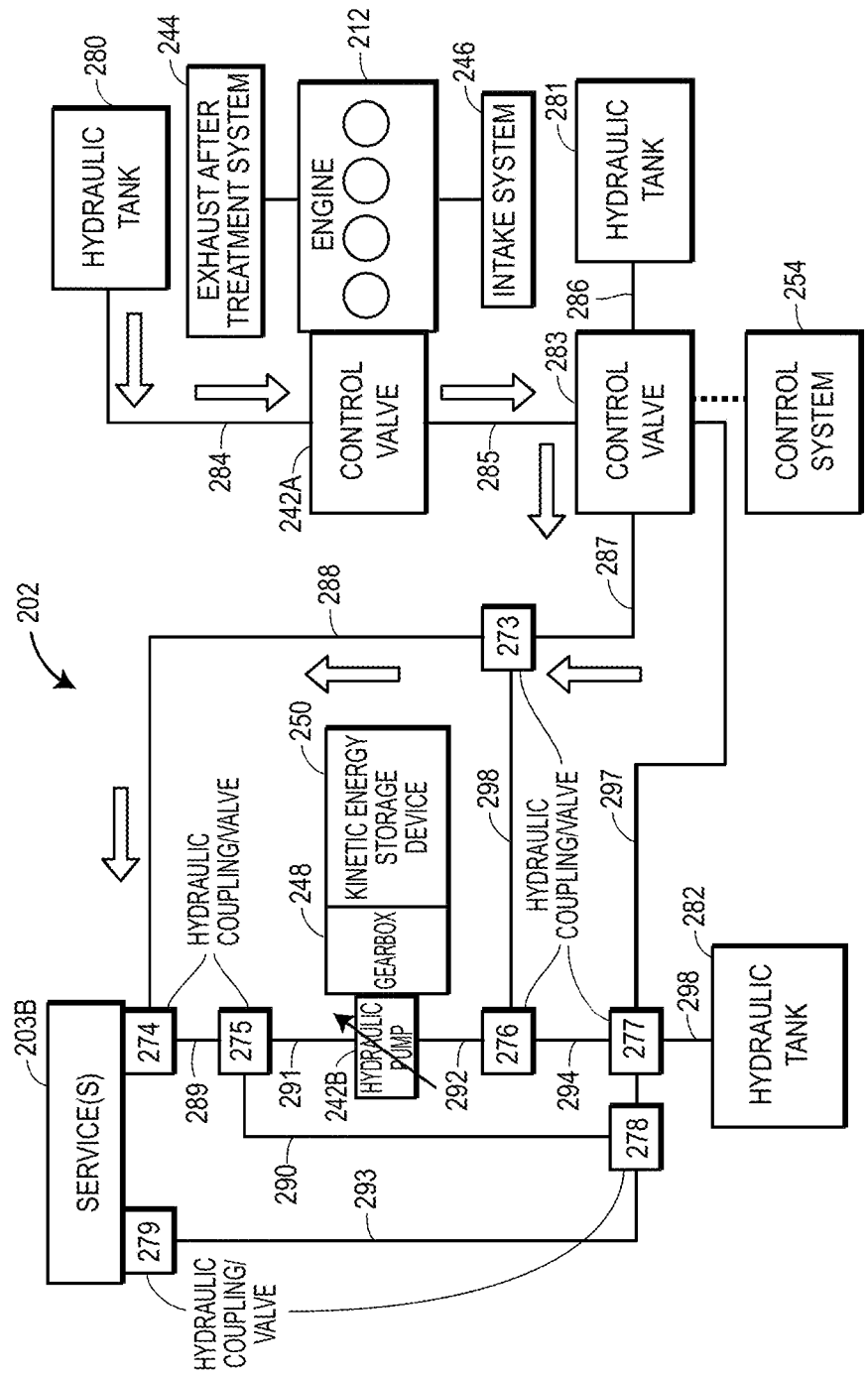
FIGS. 4 to 7 are schematic representations of an alternative machine including a hydraulic system according to the present invention.

FIG. 4 shows the situation when a service (in this case 203B) requires energy, in this case in order to lift the front loading arm. The control system 254 operates such that the engine 212 drives the hydraulic pump 242A such that hydraulic fluid passes from the hydraulic tank 280 through line 284 through the hydraulic pump 242A through line 285 through the control valve 283 through line 287 through line 288 to the service 203B thereby lifting the front loading arm.

As shown in FIG. 4, no energy is transferred from the kinetic energy storage device 250 to the service, since in this example the kinetic energy storage device is not storing any energy (for example where the kinetic energy storage device is a flywheel, the flywheel is stationary).

Figure 5:
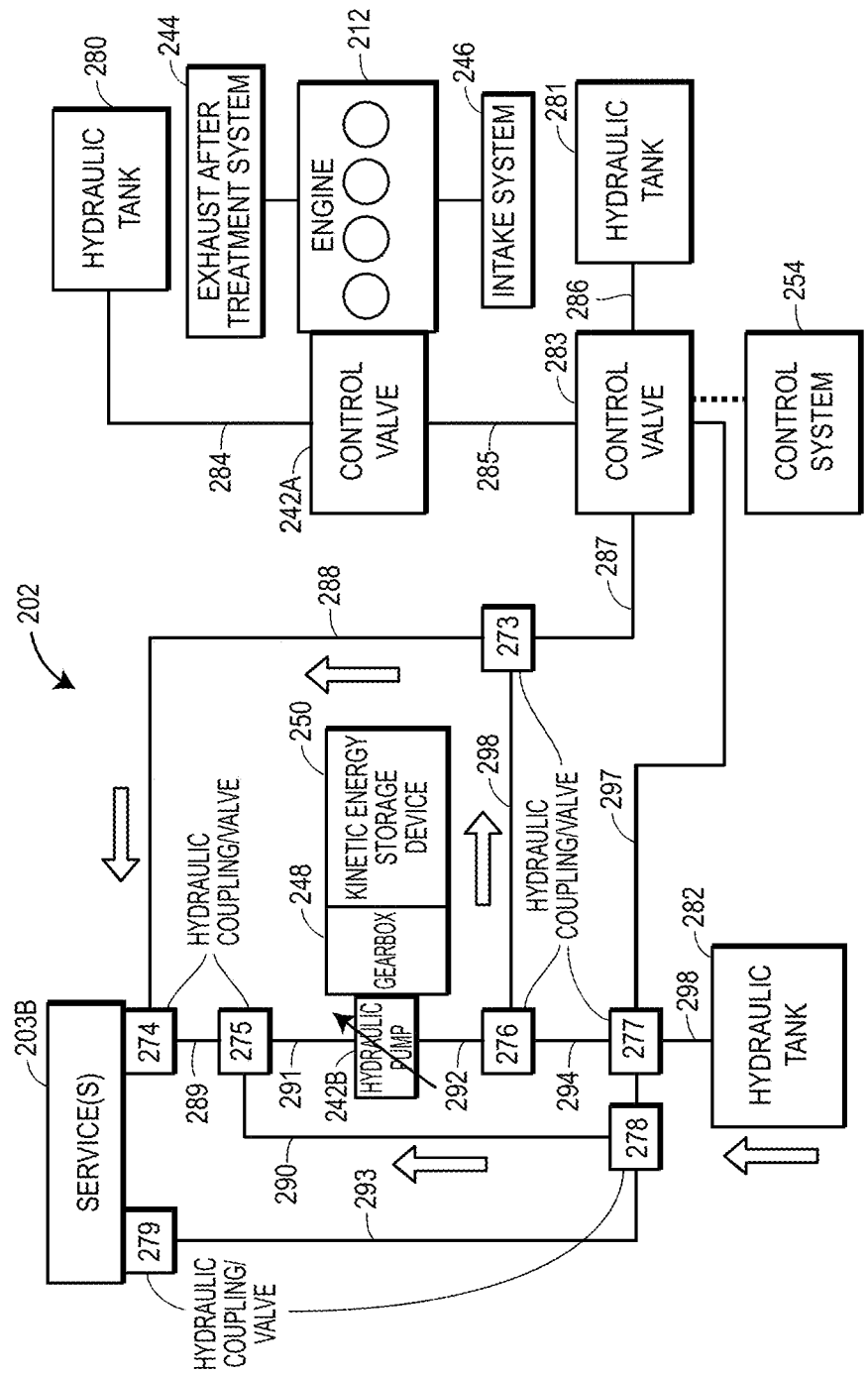

However, when there is energy stored in the kinetic energy storage device 250 that energy can be transferred to the service as shown in FIG. 5. Thus, the kinetic energy storage device 250 operates to drive the hydraulic pump 242B via the gear box 248. Under these circumstances the control system 254 operates such that hydraulic fluid from the hydraulic tank 282 passes through line 296, through line 295, through line 290, through line 291, through hydraulic pump 242B, through line 292, through line 298, through line 288 to the hydraulic service 203B. As will be appreciated, under this circumstance the service has been operated solely by energy taken from the kinetic energy storage device 250.

Under different circumstances the kinetic energy storage device and the engine can work in unison to provide energy to the service. As will be appreciated when comparing FIGS. 4 and 5, under these circumstances the control system 254 operates such that the hydraulic fluid will pass from hydraulic pump 242B through line 292 and 298 into line 288 where it will be joined by a hydraulic fluid passing from hydraulic pump 242A through line 285 and 287 to line 288.

Figure 6:
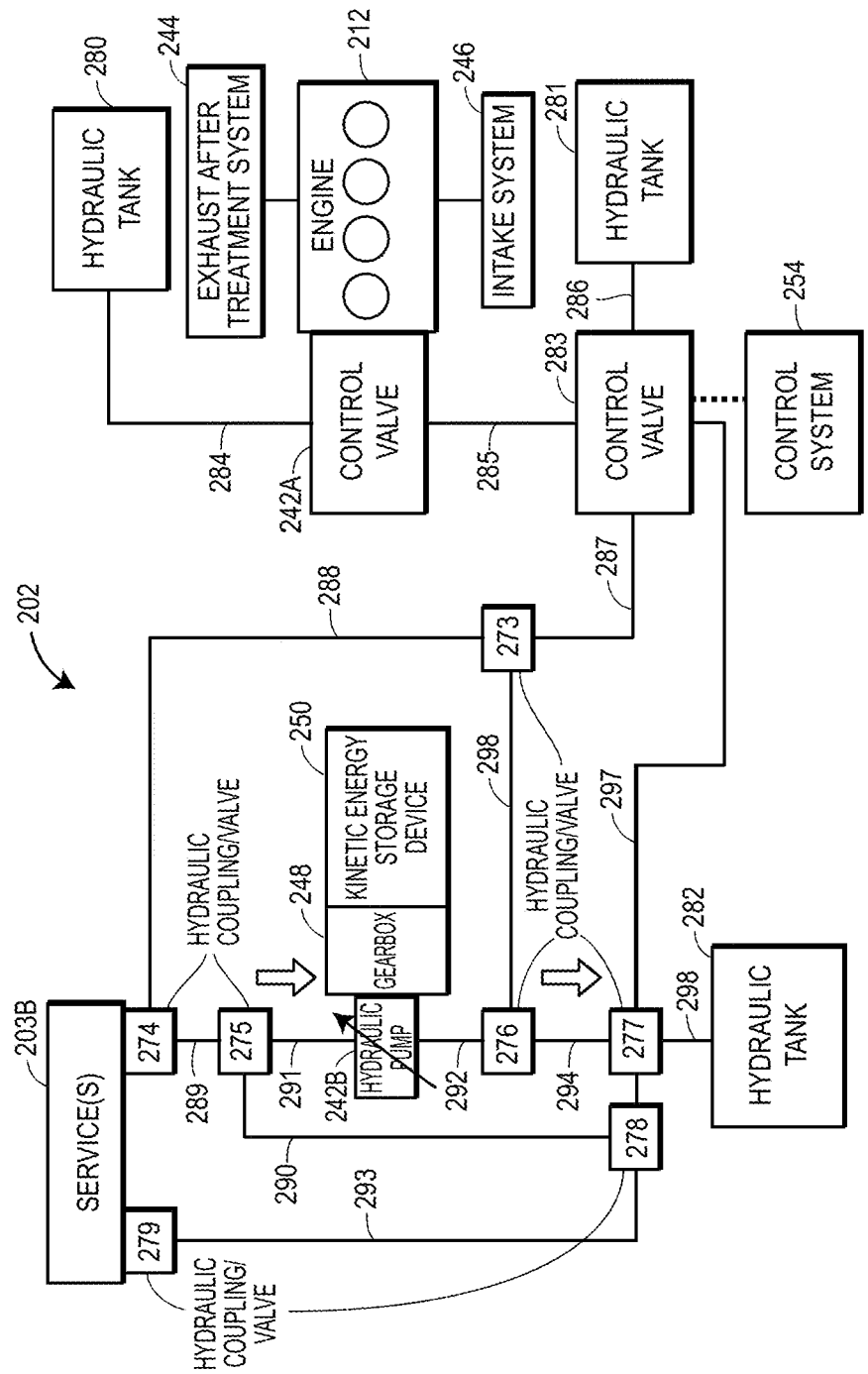

FIG. 6 shows the situation where energy can be transferred from the service 203B to the kinetic energy storage device 250. Thus, for example when the front loading arm is in a raised position and the operator wishes to lower the front loading arm, then the control system 254 operates such that hydraulic fluid passes from the service 203B through line 298 through line 291 through pump 242 B through line 292 through line 294 through line 296 to the hydraulic tank 282. Under these circumstances, the hydraulic pump will be acting as a hydraulic motor, i.e. the hydraulic fluid will drive the hydraulic pump 242B and cause it to rotate. This rotation is transferred through gearbox 248 to kinetic energy storage device 250. Thus, once the loading arm has been lowered to its desired position, the potential energy lost by the loading arm will have been converted into kinetic energy stored in the kinetic energy storage device 250.

Figure 7:
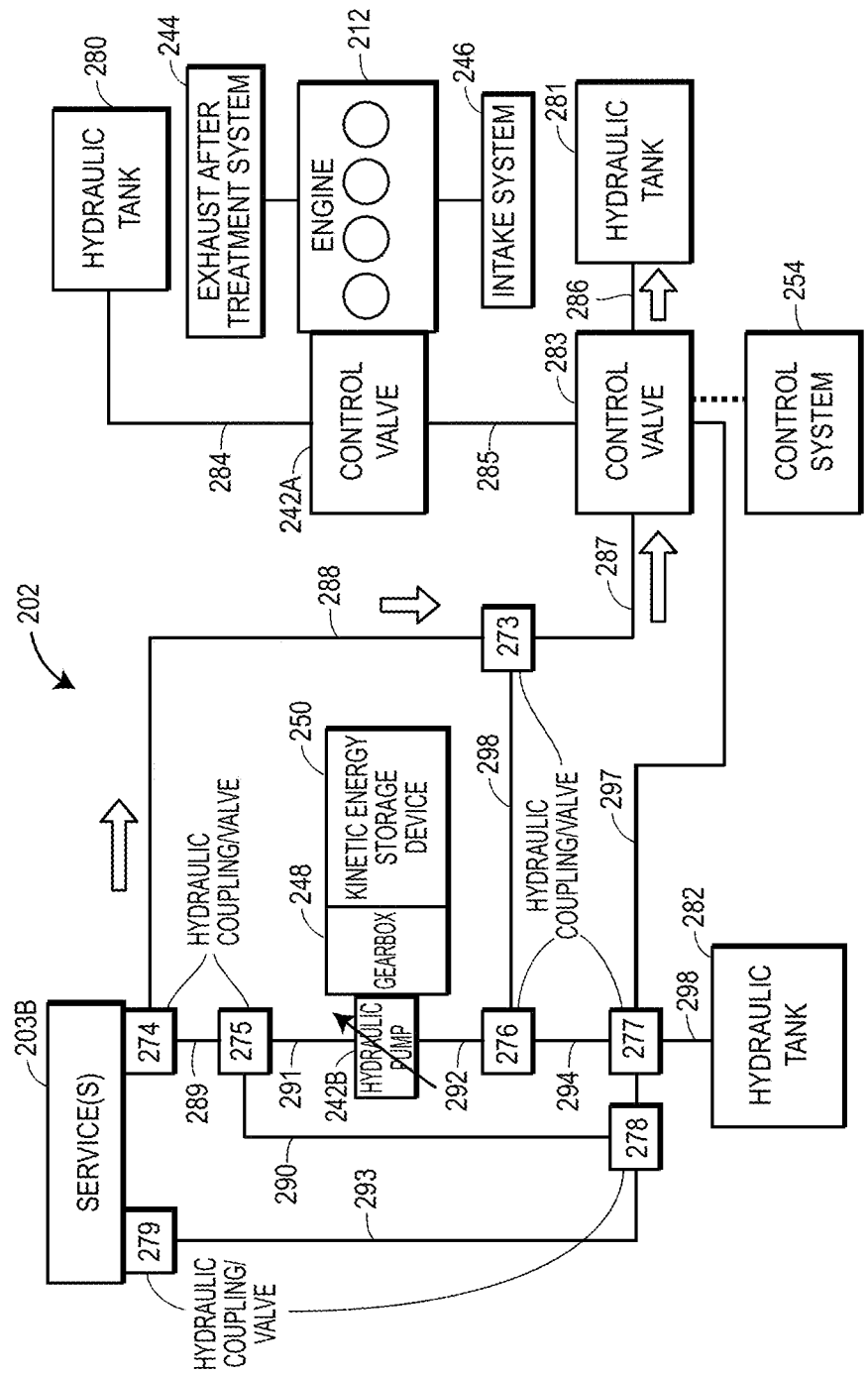

As will be appreciated, the kinetic energy storage device only has a limited capacity for storing kinetic energy, typically where the kinetic energy storage device is a flywheel, that limit is defined by the maximum speed of rotation of the flywheel. Thus, under certain circumstances, the operator may wish to lower the front loading arm but the kinetic energy storage device has no further capacity to store energy. Under these circumstances, and as shown in FIG. 7, the control system 254 operates such that hydraulic fluid from the service passes through line 288, through line 287, through control valve 283, through line 286 to the hydraulic tank 281. Because the operator will wish to lower the front loading arm in a controlled manner, the control valve ensures the correct controlled movement of the front loading arm. As shown in FIG. 7, the potential energy lost by the front loading arm is all converted to heat energy within the hydraulic fluid (as per the prior art) since in this scenario, the kinetic energy storage device 250 has no capacity for any further energy.

The engine 212 includes an intake system 246 and an exhaust after treatment system 244. When the machine 202 has been unused, for example over night, then the exhaust after treatment system 244 will be relatively cold and the kinetic energy storage device may not be storing any energy, for example where the kinetic energy storage device is a flywheel, a flywheel may be stationary. During start up, the kinetic energy storage device 250 can be used to load up the engine 212 so as to store energy in the kinetic energy storage device and increase the temperature of the exhaust after treatment system as follows. Thus upon starting of engine 212, the control system 254 operates such that hydraulic fluid passes from tank 280 through line 284 through the hydraulic pump 242A through line 285 through control valve 283, through line 287, through line 288, through line 289 (bypassing service 203B), through line 291, through hydraulic pump 242B, through line 292, through line 294, through line 296, to the hydraulic tank 282. As the hydraulic fluid is pumped through pump 242B, pump 242B acts as a hydraulic motor which drives gear box 248 which in turn drives the kinetic energy storage device 250.

Note that as shown in FIG. 4 the pump 242B and kinetic energy storage device 250 are at least operably coupled to the prime mover (engine 212) hydraulically, i.e. without the hydraulic parts of the system the pump 242B and kinetic energy storage device cannot be operably coupled to the engine. As shown in FIG. 3 there is no hydraulic coupling between the engine 112 and the kinetic energy storage device 150 since the coupling via clutch 152 and gearbox 148 is a mechanical coupling and the coupling via hydraulic pump 142, mechanical drive path 72, clutch 153, mechanical drive path 71, gearbox 149 and mechanical drive path 70 is also a mechanical coupling.

Gearbox 248 may be a continuously variable transmission (CVT) type of gearbox. The CVT gearbox may include a range change part in series with the CVT part in order to increase the working range of rotational speeds of a flywheel of the kinetic energy storage device.

Hydraulic tanks 280, 281, 282 are shown as separate tanks for ease of understanding. Typically there will be a single, common tank.

As shown in FIG. 4, the hydraulic machine comprises a first and second hydraulic machine. In further embodiments the hydraulic machine may be a single hydraulic machine such as a single pump/motor.

Figure 8:
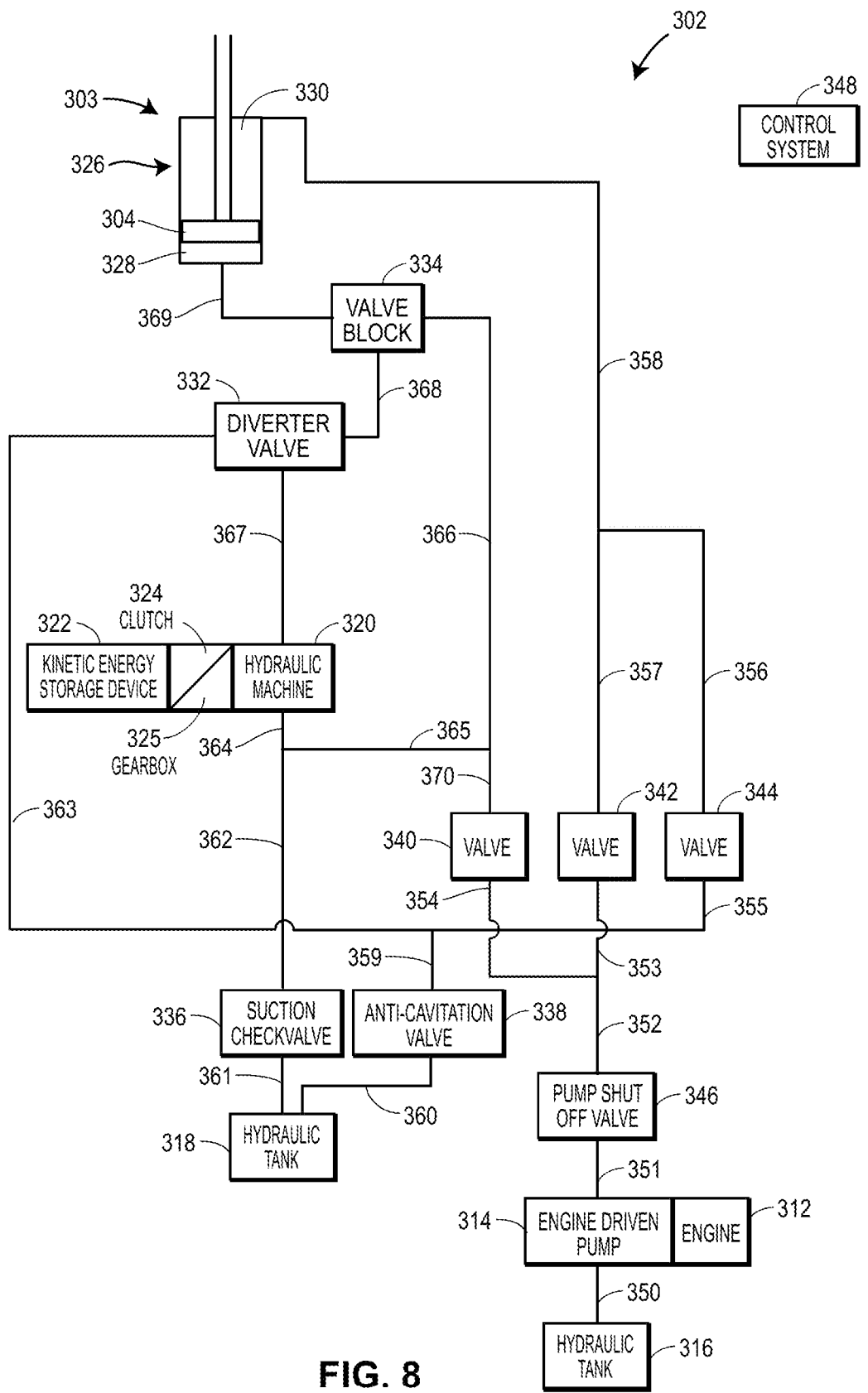
FIGS. 8 to 14 are schematic views of a further embodiment of a machine including a hydraulic system according to the present invention.
Figure 14:
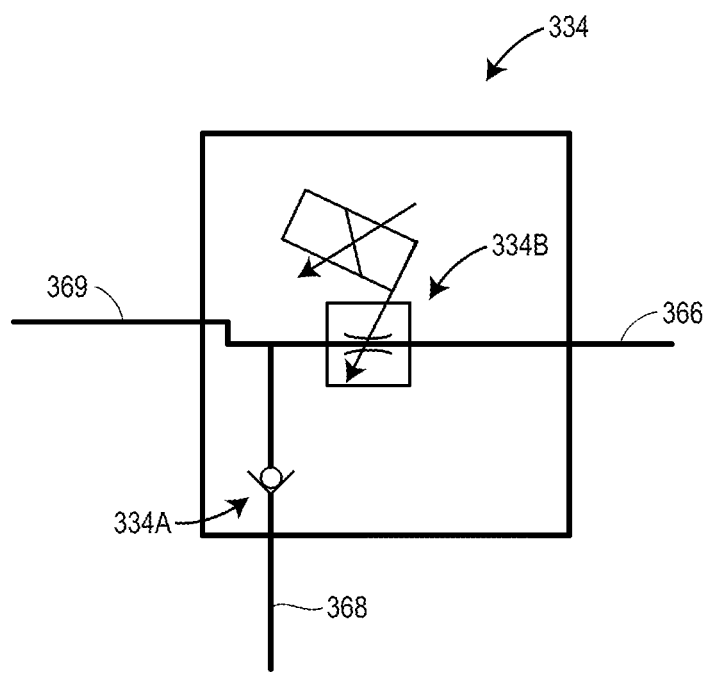

With reference to FIGS. 8 and 14 there is shown a further embodiment of a working machine 302 including an engine 312 (also known as a prime mover) and an engine driven pump 314. Machine 302 includes hydraulic tanks 316 and 318. A hydraulic machine 320 in the form of a variable capacity hydraulic pump/motor (in one example a variable capacity swash plate pump/motor) is selectively coupleable to a kinetic energy storage device 322 in the form of a flywheel by a clutch 324 and gearbox 325. A hydraulic service 303 is in the form of a hydraulic ram 326 having a main hydraulic chamber 328 and a rod side hydraulic chamber 330. There is a diverter valve 332, a suction check valve 336 and an anti-cavitation valve 338. A valve block 334 includes a variable valve 334B and a check valve 334A as best seen in FIG. 14. There is also included valves 340, 342 and 344 and pump shut off valve 346. Hydraulic lines 350, 351, 352, 353, 354, 355, 356, 357, 358, 359, 360, 361, 362, 363, 364, 365, 366, 367, 368, 369 and 370 connect various components as will be further described below. A control system 348 (only shown on FIG. 8) controls the various valves as will be further described below. For clarity purposes, the connection between the control system 348 and the various valves has not been shown on FIG. 8.

Operation of the working machine under various operating conditions is as follows:

System Start-Up

When the machine 302 has been left unused for a period of time (for example overnight), any hydraulic pressure in any of the hydraulic lines will typically have decayed to zero, the flywheel 322 will be stationary and the engine 312 will be stationary. Prior to starting the engine, the control system is operated to close valves 334B, 342 and 344. The control system opens valve 340. The control system operates diverter valve 332 so that hydraulic lines 367 and 363 are connected, and as such line 368 will be isolated from both lines 367 and 363. The control system opens valve 346 and valve 338.

When the engine 312 is started, it will drive pump 314 which will draw hydraulic fluid from tank 316 via hydraulic line 350 and pressurise hydraulic lines 351, 352, 353, 354, 370, 366, 365, 362, 364.

As mentioned above, the suction check valve 336 prevents pressurised fluid in line 362 passing to line 361. Because valve 342 is closed, then hydraulic line 357 is not pressurised. Because valve 334B is closed, then lines 368 and 369 are not pressurised by fluid from line 366.

Accordingly, hydraulic fluid is supplied to the hydraulic machine 320 from the engine driven pump 314. The hydraulic machine 320 is arranged to operate as a motor and because the control system has engaged clutch 324 the rotation of the hydraulic machine 320 causes a consequential transfer of energy to the kinetic energy storage device 322 which therefore speeds up from its initial rest condition.

During the transfer of energy from the hydraulic machine to the kinetic energy storage device the control system the varies the capacity of the hydraulic machine 320. Thus, initially the flywheel speed of the kinetic energy storage device will be relatively low and the control system will set the displacement capacity of the hydraulic machine to be a relatively high (for example by setting the swash plate angle of a swash plate pump/motor at a relatively high angle). As the energy is transferred to the kinetic energy storage device the flywheel will progressively increase in rotational speed and the control system will progressively reduce the displacement capacity of the hydraulic machine. In this way, the rotational speed of the hydraulic machine will progressively increase as the rotational speed of the flywheel increases.

Once the hydraulic fluid has passed through the hydraulic machine 320 it passes sequentially into hydraulic lines 367, 363 and 359 whereupon it passes through the anti-cavitation valve 338 (which has been opened by the control system) into line 360 and finally to tank 318. Because valve 344 is closed, this return fluid does not pass into line 356.

Figure 9:
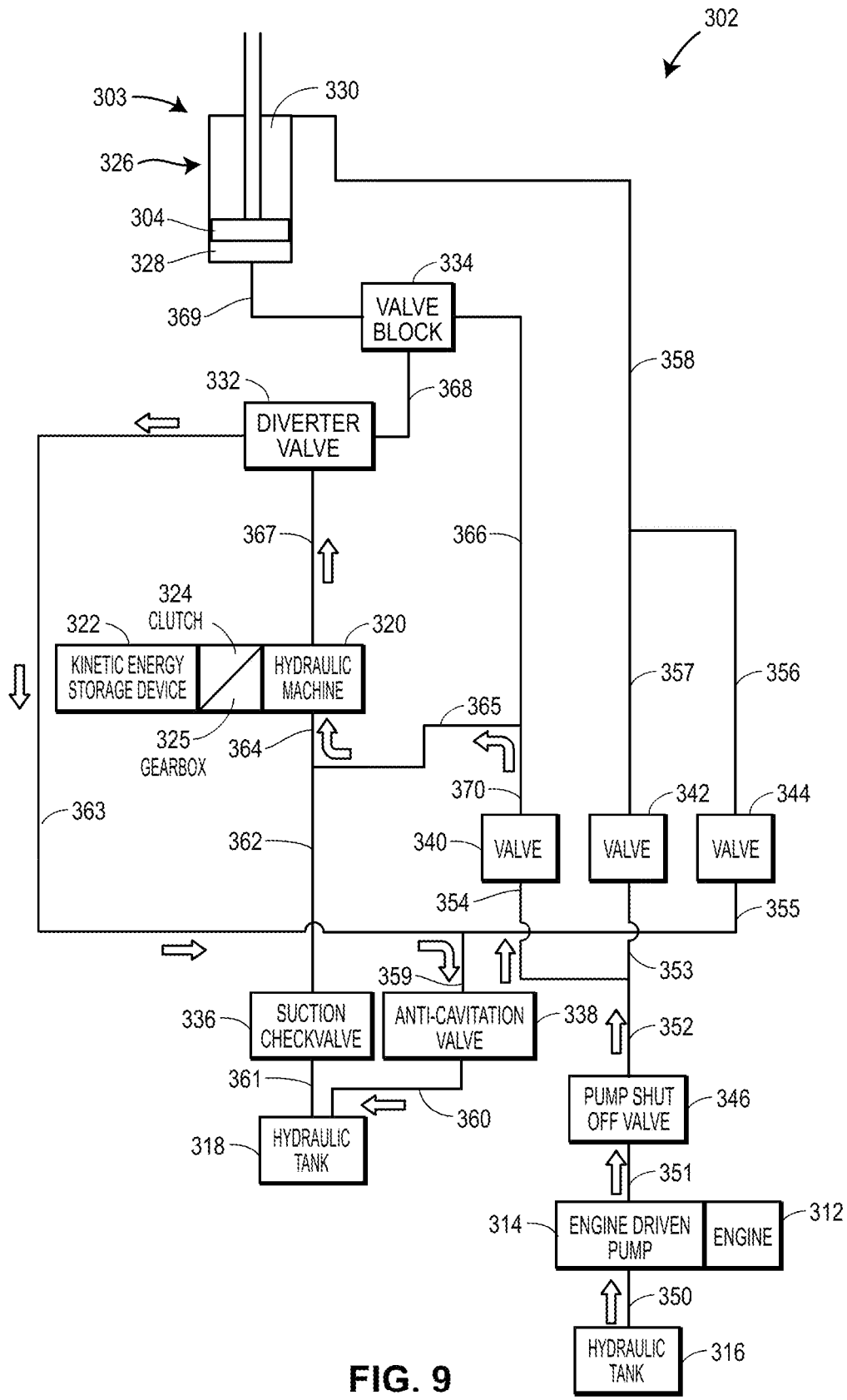

FIG. 9 shows the fluid flow during system start-up and table 1 summarises the various positions of the valves.

Flywheel Idle

During system start-up the speed of the flywheel will progressively increase and once it has reached a predetermined maximum idle speed then the clutch 324 is disengaged and the valve 346 is closed. Once this has occurred, the speed of the flywheel will progressively decrease, as a result of internal friction of the flywheel mechanism. When the flywheel reaches a predetermined minimum idle speed, then the valve 346 is opened and the clutch 324 is re-engaged and the control system controls the displacement capacity of the hydraulic machine (as described above) such that the flywheel increases in speed until the predetermined maximum idle speed is achieved whereupon the valve 346 is again closed and the clutch 324 is again disengaged. In this manner the flywheel can be kept running at a speed between its maximum idle speed and its minimum idle speed until such time as the service 303 is operated.

Energy Recovery from Hydraulic Service

In order to recover energy from the hydraulic surface 303, the pressurised hydraulic fluid in the main hydraulic chamber 328 is fed to the hydraulic machine 320 which then acts as a hydraulic motor so as to increase the speed of the flywheel 322.

In more detail, the valve 334B is opened by the control system thereby coupling hydraulic line 369 to hydraulic line 366. Valve 340, valve 346 and valve 342 are all closed and valve 344 is open.

Under these circumstances pressurised hydraulic fluid from the main hydraulic chamber 328 passes into hydraulic line 369, through valve 334B into hydraulic line 366 into hydraulic line 365 into hydraulic line 364 and through the hydraulic machine 320 which acts as a motor. Clutch 324 is engaged and accordingly the motor transfers energy to the kinetic energy storage device 322 which in turn speeds up (to a speed faster than the maximum idle speed) to store the energy in a kinetic form. During the transfer of energy from the hydraulic machine to the kinetic energy storage device the control system varies the capacity of the hydraulic machine 320. Thus, initially the rotational speed of the kinetic energy storage device will be somewhere between the minimum idle speed and the maximum idle speed. The control system will set the capacity of the hydraulic machine to a suitable displacement (for example by setting the swash plate angle of the swash plate pump/motor to a suitable angle). As energy is transferred to the kinetic energy storage device the flywheel will progressively increase in rotational speed and the control system will progressively reduce the displacement capacity of the hydraulic machine (for example by reducing the swash plate angle of a swash plate pump/motor). In this way the rotational speed of the hydraulic machine will progressively increase as the rotational speed of the flywheel is increased.

The hydraulic fluid then passes into line 367 through diverter valve 332 to line 363. Some of this hydraulic fluid will pass into line 355, through open valve 344 into line 356 into line 358 to replenish fluid in the rod side hydraulic chamber 330. The remainder of the hydraulic fluid passing through line 363 will pass into line 359 through the open anti-cavitation valve 338 through line 360 into tank 318.

Figure 10:
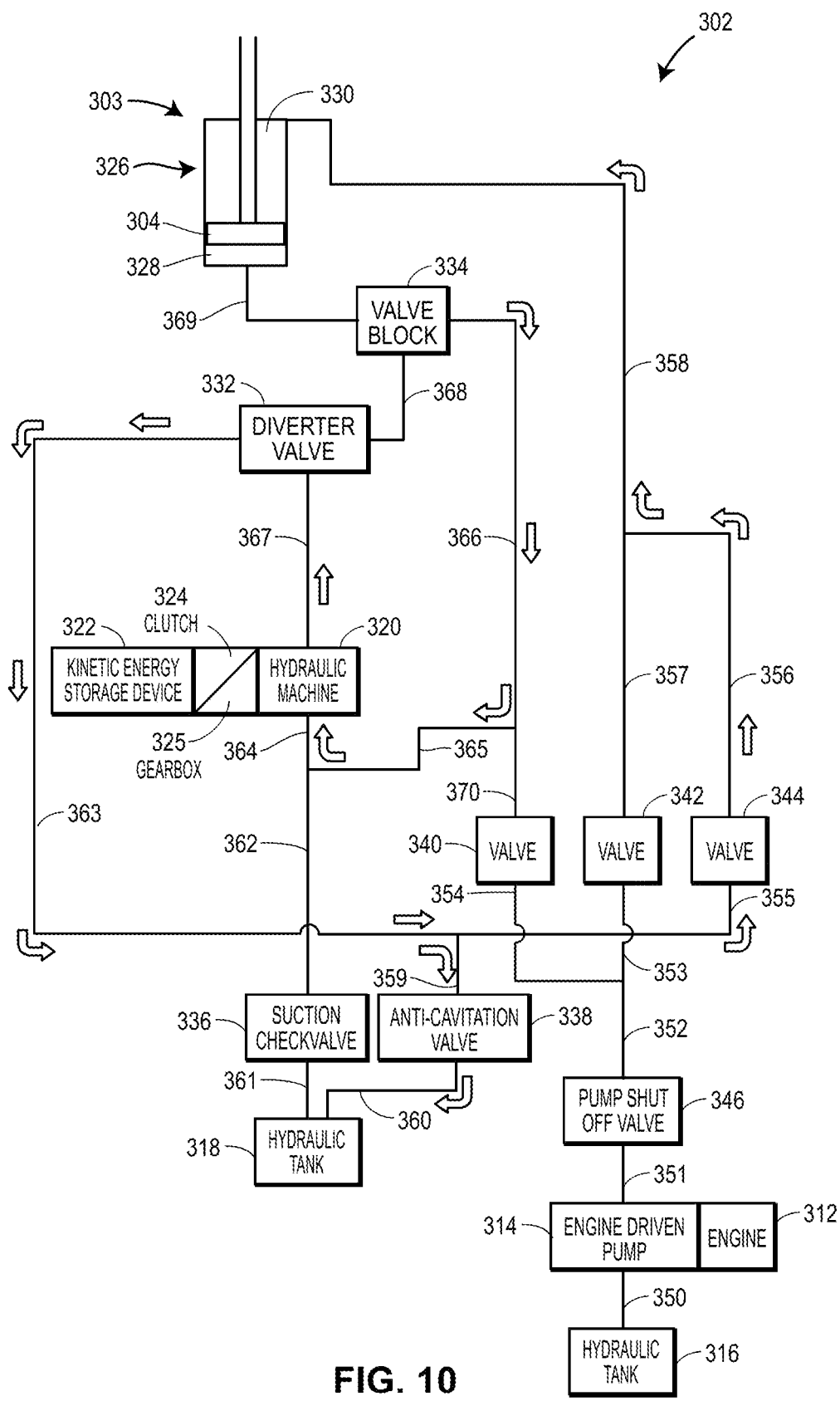

FIG. 10 shows how the hydraulic fluid flows in the system when energy is being recovered from the hydraulic service 303.

Dissipation of Excess Energy During Energy Recovery from Hydraulic Service

Under certain circumstances the amount of energy recoverable from the hydraulic circuit may exceed the amount of energy which can be supplied to the kinetic energy storage device.

Figure 11:
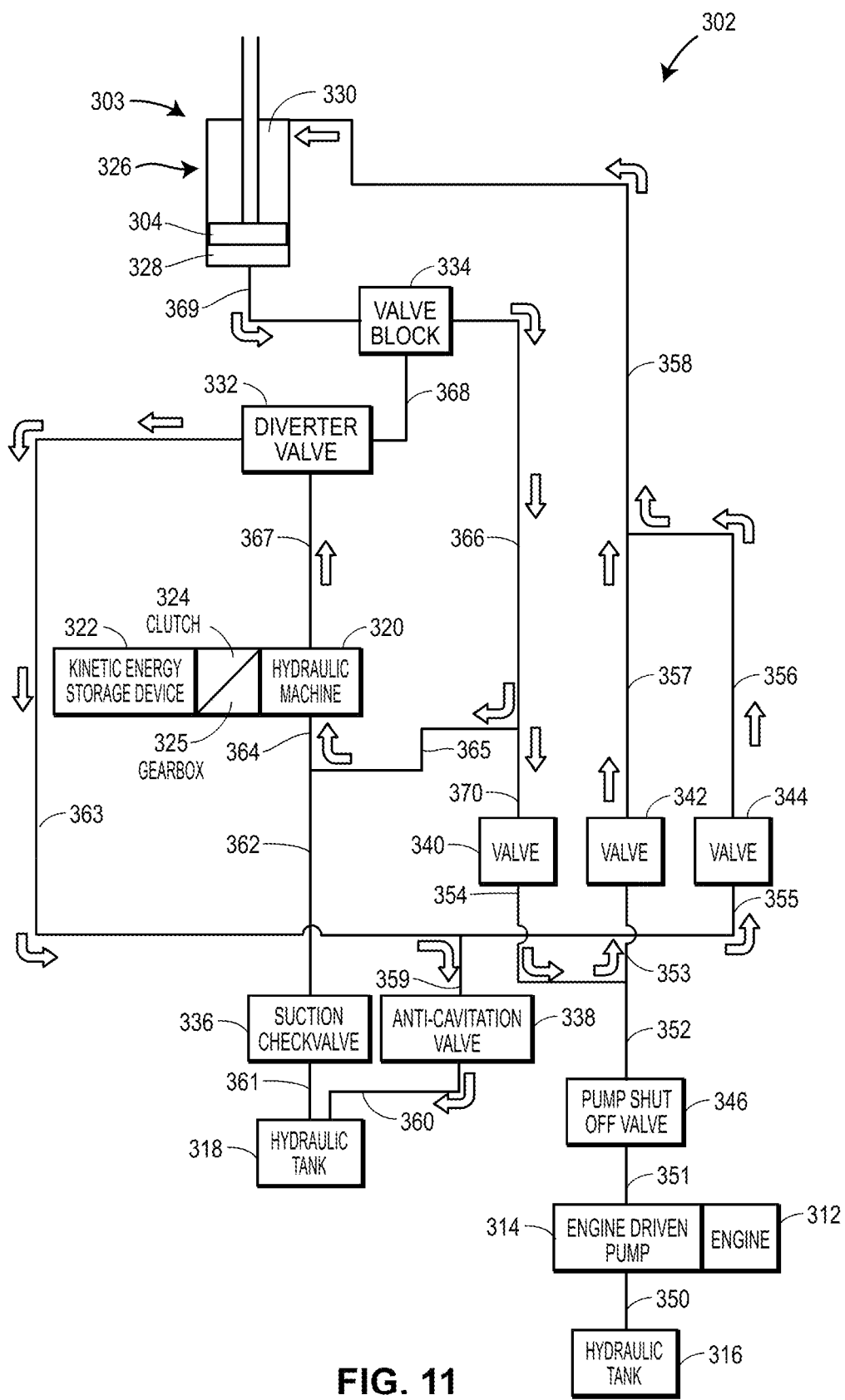

Thus, the maximum torque which can be applied to an input shaft of the kinetic energy storage device may be limited, for example if an excess torque is applied to the input shaft of the kinetic energy storage device then damage may occur. Accordingly, there may be certain circumstances where not all the power that is potentially recoverable from the service 303 can be transferred to the kinetic energy storage device 322. In particular where the hydraulic service 303 is a hydraulic ram which raises and lowers a back hoe arm such as back hoe arm 23B as shown in FIG. 1, then there may be circumstances where the operator of working machine wishes to lower the arm faster than the energy of the lowering arm can be transferred to the kinetic energy storage device 322. Under these circumstances, valves 340 and 342 may be partially opened in order to divert hydraulic fluid from the main hydraulic chamber 328 away from the hydraulic machine 320. FIG. 11 shows some of the hydraulic fluid from line 366 passing into line 370, through valve 340 into line 354, into line 353, through valve 342, into line 357 and then on through line 358 to the rod side hydraulic chamber 330. The remainder of the hydraulic fluid from the main hydraulic chamber 328 passes through hydraulic machine 320 (the capacity of which is controlled by the control system as described above) diverter valve 322 and valve 334 in a manner similar to that shown in FIG. 10 in order to recover energy from that hydraulic fluid.

Re-Using Recovered Energy

In order to re-use the recovered energy, the hydraulic machine is powered by the kinetic energy storage device and acts as a hydraulic pump to supply pressurised hydraulic fluid to the main hydraulic chamber 328 of the hydraulic service 303.

In more detail, valves 340, 342 and 346 are closed and valve 344 is open. Valve 334B is closed. Diverter valve 332 couples lines 367 to line 368 thereby isolating line 363 from both lines 367 and 368.

The kinetic energy previously stored in the kinetic energy storage device 322 is transferred via clutch 324 and gearbox 325 to the hydraulic machine 320 which acts as a pump and draws hydraulic fluid from tank 318 via line 361 through check valve 336 and lines 362 and 364. The hydraulic fluid which has been pressurised by the hydraulic machine 320 acting as a pump then passes into line 367 through diverter valve 332 into line 368 through check valve 334A into line 369 and into the main hydraulic chamber 328, thereby operating the hydraulic service 303 to do work. As the volume of the main hydraulic chamber 328 increases as the piston 304 moves within the hydraulic ram 326 then the volume of the rod side hydraulic chamber 330 decreases causing hydraulic fluid to pass into hydraulic line 358 through hydraulic line 356 through open valve 344 through hydraulic line 355 through hydraulic line 359 through the open anti-cavitation valve 338 through line 360 into tank 318.

During the transfer of energy from the kinetic energy storage device to the hydraulic machine the control system varies the capacity of the hydraulic machine. Thus, initially the flywheel speed of the kinetic energy storage device will be relatively high. The control system will set the displacement capacity of the hydraulic machine to a relatively low displacement (for example by setting the swash plate angle of a swash plate pump/motor at a relatively low angle). As energy is transferred from the kinetic energy storage device to the hydraulic machine the flywheel of the kinetic energy storage device will progressively decrease in rotational speed and the control system will progressively increase the displacement capacity of the hydraulic machine. In this way the rotational speed of the hydraulic machine will progressively decrease as the rotational speed of the flywheel progressively decreases.

Figure 12:
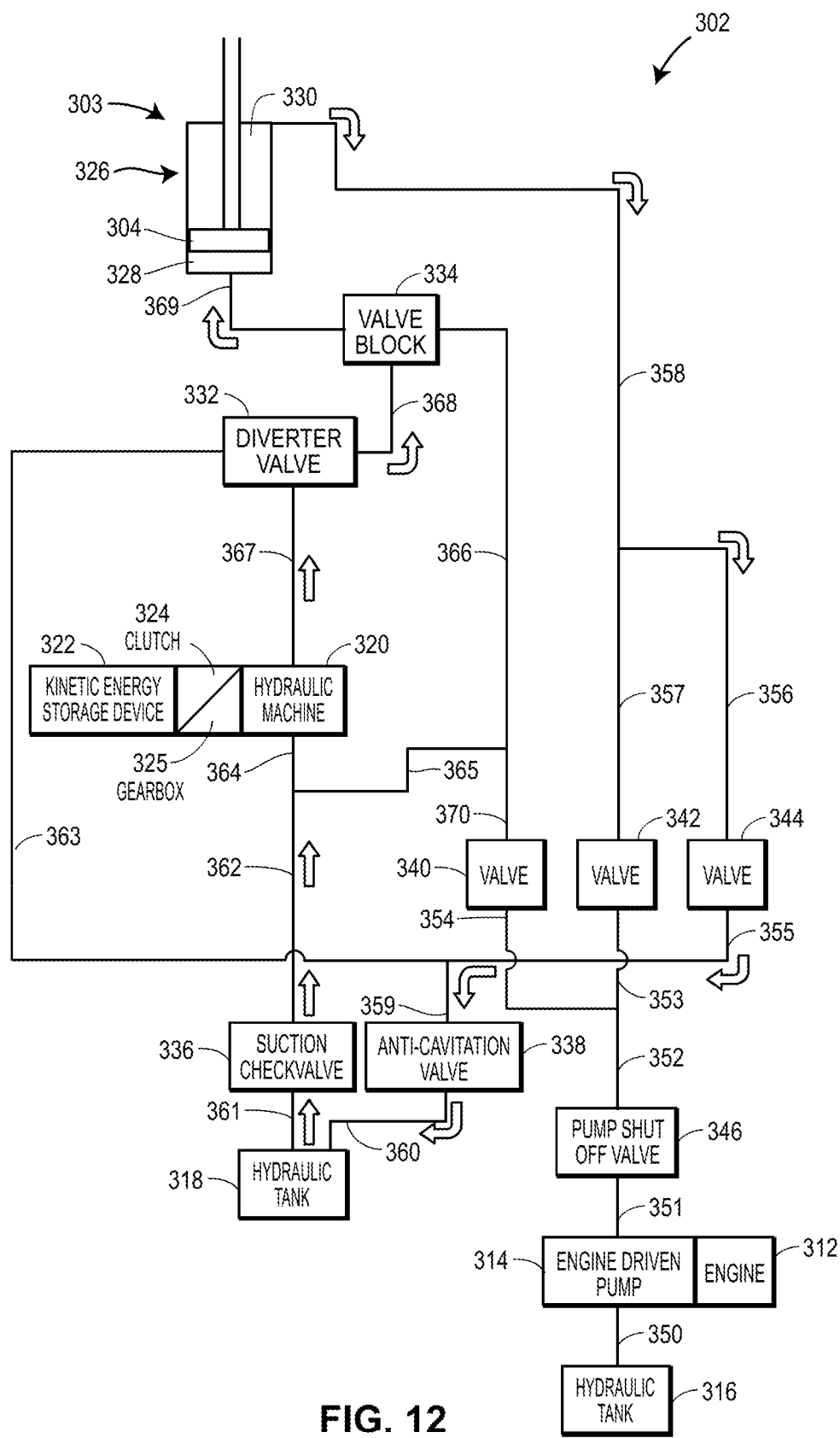

FIG. 12 shows the flow of hydraulic fluid under these circumstances.

Using Engine Power Only to Operate the Hydraulic Service

There may be certain circumstances wherein the total amount of energy required to operate the hydraulic service is more than the energy stored in the kinetic energy storage device. By way of example, the operator may require a boom or the like to be fitted to its full height whereas the energy stored in the kinetic energy storage device is only sufficient to lift the boom or the like to half its full height. Under these circumstances the energy required to lift the boom to half its full height will be supplied by the kinetic energy storage device and the energy required to lift the boom from half its full height to its full height will be supplied by the engine.

Under these latter circumstances the engine 312 will drive the engine driven pump 314 which will take hydraulic fluid from tank 316 via line 350 and supply pressurised hydraulic fluid through line 351 through open valve 346 through open valve 340 through line 370 and line 366 through open valve 344B thereby supplying hydraulic fluid to the main hydraulic chamber 328 so as to lift the boom in this example from half height to full height. In embodiments where the hydraulic machine 320 is a swash plate pump, the swash plate may be set to a zero degree angle to prevent fluid passing through the hydraulic machine. Alternatively, or additionally a separate valve may be provided to prevent fluid passing through the hydraulic machine, for example a valve may be positioned in hydraulic line 365 or hydraulic line 364 for this purpose.

Figure 13:
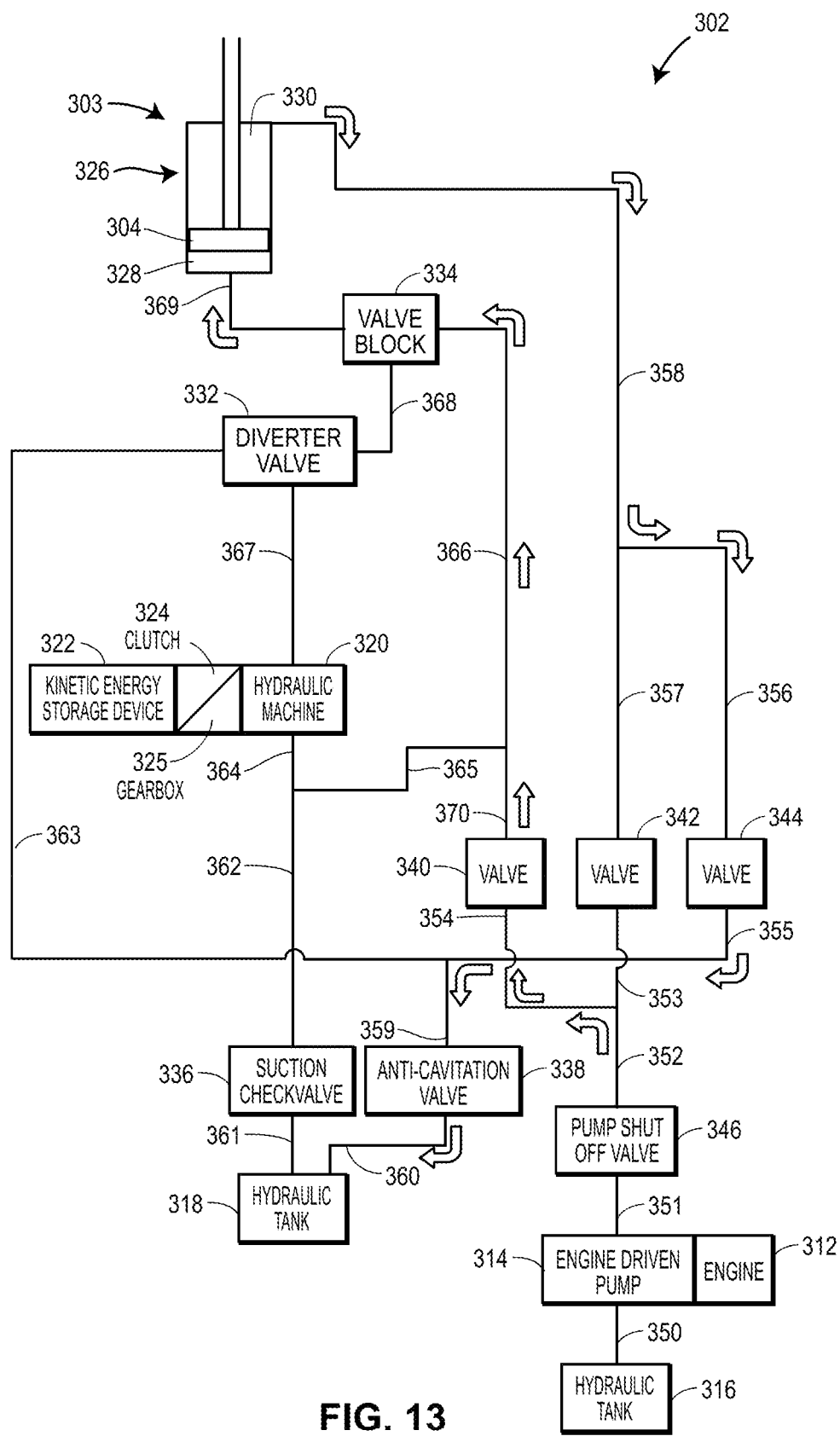

FIG. 13 shows the flow of hydraulic fluid under these circumstances. The return flow from the rod side hydraulic chamber 330 is via hydraulic line 358 and 356, open valve 344, hydraulic line 355 and 359, open anti-cavitation valve 338, line 360 to tank 318 in a manner similar to that shown in FIG. 12.

Using Engine Power and Recovered Energy to Operate the Hydraulic Service

Under certain circumstances the amount of energy required to operate the hydraulic service may exceed the amount of energy which can be supplied by the kinetic energy storage device. For example, where the hydraulic service 303 is a hydraulic ram which raises and lowers the back hoe arm, such as back hoe arm 23B as shown in FIG. 1, then there may be circumstances when the operator of the working machine wishes to raise the arm at a speed which requires more power than the kinetic energy storage device can supply. Under these circumstances pressurised hydraulic fluid flow from the hydraulic machine 320 to the valve block 334, as shown in FIG. 12 is combined with pressurised hydraulic flow from the engine driven on pump 314 arriving at the valve block 334 as shown in FIG. 13. Under these circumstances, and as best understood from FIG. 14, flow from the hydraulic machine 320 will be transferred through line 368, through open check path 334A and into line 369 and flow from the engine driven pump 314 will pass through line 366, through open valve 334 to line 369.

The working machine 302 may be any type of working machine and in particular is not limited to a back hoe loader machine (an example of which is shown in FIG. 1). The hydraulic service 303 is not limited to being a hydraulic ram. The hydraulic service 303 could operate to "slew" one part of the working machine relative to another part of the working machine. Where the hydraulic service 303 is a hydraulic ram, the hydraulic ram could cause a bucket to pivot relative to a front loading arm, or could cause a front loading arm to pivot relative to a chassis, or could cause a back hoe arm to pivot about a generally horizontal axis relative to a carriage, or could cause a dipper arm to pivot relative to a back hoe arm, or could cause a bucket to pivot relative to a dipper arm, or could cause extension and/or retraction of stabilising legs relative to a chassis of the working machine, or could cause a carriage to move laterally relative to a chassis. However, where the hydraulic service 303 is a hydraulic ram it is not limited to being operated as discussed above and a person skilled in the art would readily appreciate that other types of hydraulic services are known and are applicable to the hydraulic service 303.

The engine 312 may be an internal combustion engine, and in particular a compression ignition internal combustion engine such as a diesel engine or a spark ignition internal combustion engine such as a petrol engine. However, other types of engines are applicable to the present invention. The engine driven pump 14 may be a fixed displacement pump or it may be a variable displacement pump. The engine driven pump 314 may be directly coupled to the engine, i.e. it may be driven at engine speed or alternatively it may be coupled to the engine via a gear arrangement, and therefore may or may not rotate at engine speed.

For ease of understanding, tanks 316 and 318 have been shown as separate tanks, though typically they may be a single common tank.

treatment system. Under such circumstances it is possible to operate the working machine 302 by starting with the exhaust after treatment system at a temperature below normal working temperature, the engine 312 may be started and the kinetic energy storage device 322 may apply a load to the engine so as to store energy in the kinetic energy storage device 322 and increase the temperature of the exhaust after treatment system.

TABLE 1

|  | Start up (FIG. 9) | Energy Recovery (FIG. 10) | Excess Energy to recover (FIG. 11) | Reusing recovery energy (FIG. 12) | Service operated by engine only (FIG. 13) | Service operated by engine and recovered energy |
|---|---|---|---|---|---|---|
| Valve 346 | open | closed | closed | closed | open | open |
| Valve 340 | open | closed | open | closed | open | open |
| Valve 342 | closed | closed | open | closed | closed | closed |
| Valve 344 | closed | open | open | open | open | open |
| Valve 338 | open | open | open | open | open | open |
| Check valve 336 | closed | closed | closed | open | closed | open |
| Diverter valve 332 | line 367 coupled to line 363 | line 367 coupled to line 363 | line 367 coupled to line 363 | line 367 coupled to line 368 | line 367 coupled to line 368 | line 367 coupled to line 368 |
| Check valve 334A | closed | closed | closed | open | closed | open |
| Valve 334B | closed | open | open | closed | open | open |

The kinetic energy storage device 322 in one example is a flywheel, in particular a solid flywheel (i.e. not a fluid flywheel). Device 322 is coupled to the hydraulic machine 320 via clutch 324 and gearbox 325. The kinetic energy storage device 322 may be coupled to clutch 324 which in turn is coupled to gearbox 325 which in turn is coupled to the hydraulic machine 320, or alternatively the kinetic energy storage device 322 may be coupled to the gearbox 325 which in turn is coupled to the clutch 324 which in turn is coupled to the hydraulic machine 320. The gearbox may be a planetary gearbox. Where the gearbox is a planetary gearbox the clutch may be selectively engaged to prevent movement of one part of the planetary gearbox moving relative to another part of the planetary gearbox and may be selectively disengaged to allow one part of the planetary gearbox to move relative to the other part of the planetary gearbox. In particular the clutch may be engaged to prevent a ring gear of a planetary gearbox rotating relative to a casing of a planetary gearbox. In order to transfer energy from the hydraulic machine to the kinetic energy storage device the hydraulic machine may drive planets of a planetary gearbox which in turn drives a sun of a planetary gearbox which in turn drives the kinetic energy storage device. In order to transfer energy from the kinetic energy storage device to the hydraulic machine the kinetic energy storage device may drive a sun of a planetary gearbox which in turn may drive planets of a planetary gearbox which may in turn drive the hydraulic machine.

The diverter valve 332 may be operated by a hydraulic pilot signal or it may be operated by a solenoid. The valve 334B as shown in FIG. 14 is a variable orifice solenoid actuated valve, though in further embodiments pilot pressure actuation of this valve is possible and an alternative variable type valve may be used. Valve 338 may be a solenoid operated valve and it may be a proportional valve. Valves 340, 342 and 344 may be solenoid operated variable valves. Working machine 302 may incorporate an exhaust after

The invention claimed is:

1. A hydraulic system comprising: a hydraulic fluid, a hydraulic machine for pressurizing the hydraulic fluid, a hydraulic circuit operatively coupled to the hydraulic machine and arranged to deliver the pressurized hydraulic fluid to a hydraulic actuator, the hydraulic machine being configured to receive the pressurized hydraulic fluid from the hydraulic actuator and a kinetic energy storage device for storing energy in a kinetic form, the kinetic energy storage device being operably coupled to the hydraulic machine, the system being configured such that the hydraulic machine is operable to transfer energy from the pressurized hydraulic fluid received from the hydraulic actuator to the kinetic energy storage device, and
  wherein the hydraulic machine is defined by a first hydraulic pump for pressurizing the hydraulic fluid and a second hydraulic pump being configured to receive the pressurized hydraulic fluid from the actuator, and the kinetic energy storage device is operably coupled to the second hydraulic pump, the system being configured such that the second hydraulic pump is operable to transfer energy from the pressurized hydraulic fluid received from the hydraulic actuator to the kinetic energy storage device,
  wherein the first hydraulic pump is configured to be mechanically driven by a prime mover; and
  further wherein the kinetic energy storage device is a flywheel which is operably coupled to the second hydraulic pump such that the flywheel rotates faster than the second hydraulic pump.

2. A hydraulic system as defined in claim 1 wherein the system is configured such that the hydraulic machine is operable to transfer energy from the flywheel to the pressurized hydraulic fluid.

3. A hydraulic system as defined in claim 2 wherein the hydraulic machine and the hydraulic circuit are configured to transfer energy from the flywheel to the hydraulic actuator.

4. A hydraulic system as defined in claim 1 wherein the hydraulic machine and the hydraulic circuit are configured to transfer energy from the flywheel to a further hydraulic actuator.

5. A hydraulic system as defined in claim 1 wherein the flywheel is operably coupled to the hydraulic machine via a clutch which is selectively operable to prevent transfer of energy from the variable displacement hydraulic machine to the flywheel.

6. A hydraulic system as defined in claim 1 wherein the flywheel is operably coupled to the hydraulic machine by a clutch which is selectively operable to prevent transfer of energy from the flywheel to the hydraulic machine.

7. A vehicle including a hydraulic system as defined in claim 1 wherein the hydraulic actuator is operable to raise a lifting arm.

8. A method of operating a vehicle including a hydraulic system as defined in claim 1 including operating the actuator so as to reduce the potential energy of the vehicle or a part of the vehicle and storing at least some of the potential energy as kinetic energy in the flywheel.

9. A method of operating an internal combustion engine including the steps of providing an internal combustion engine having an exhaust after treatment system, providing a hydraulic system as defined in claim 1 and, starting with the exhaust after treatment system that a temperature below a normal working temperature, starting the internal combustion engine and using the flywheel to apply a load to the engine so as to store energy in the flywheel and increase the temperature of the exhaust after treatment system.

10. A method of operating a vehicle as defined in claim 8, including the steps of providing an internal combustion engine having an exhaust after treatment system and, starting with the exhaust after treatment system that a temperature below a normal working temperature, starting the internal combustion engine and using the flywheel to apply a load to the engine so as to store energy in the flywheel and increase the temperature of the exhaust after treatment system.

11. A method of operating a vehicle including a hydraulic system as defined in claim 1 including the steps of:
a) arranging the variable displacement hydraulic actuator to provide the pressurized hydraulic fluid,
b) driving the variable displacement hydraulic machine with the pressurized hydraulic fluid,
c) transferring energy from the variable displacement hydraulic machine to the flywheel,
d) storing kinetic energy in the flywheel for a period of time.

12. A method as defined in claim 11 wherein during step b) and/or step c) and/or step d), arranging at least some of the pressurized hydraulic fluid provided by the actuator to separately depressurize.

13. A method as defined in claim 12 wherein during step c) arranging at least some of the pressurized hydraulic fluid provided by the actuator to separately depressurize including modulating the separate depressurization of the at least some of the pressurized hydraulic fluid.

14. A method as defined in claim 11 including subsequently transferring energy from the flywheel to the variable displacement hydraulic machine, arranging for the variable displacement hydraulic machine to pressurize the hydraulic fluid, supplying pressurized hydraulic fluid to the hydraulic actuator to enable the hydraulic actuator to do work.

15. A method of operating a vehicle including a hydraulic system as defined in claim 11 including the steps of:
arranging the hydraulic actuator to provide pressurized hydraulic fluid to drive a second variable displacement hydraulic machine,
transferring energy from the first hydraulic machine to the flywheel, and
storing kinetic energy in the flywheel for a period of time.

16. A method as defined in claim 15 including subsequently transferring energy from a flywheel to the first hydraulic machine,
arranging for the first hydraulic machine to pressurize the hydraulic fluid, and supplying the pressurized hydraulic fluid from the first hydraulic machine to
the hydraulic actuator to enable the hydraulic actuator to do work.

17. A method as defined in claim 16 including arranging the second hydraulic machine to pressurize the hydraulic fluid and supplying the pressurized hydraulic fluid from the second hydraulic machine to the hydraulic actuator to enable the hydraulic actuator to do work.

18. A method as defined in claim 17 including simultaneously supplying pressurized hydraulic fluid from the first hydraulic machine to the hydraulic actuator and supplying pressurized hydraulic fluid from the second hydraulic machine to the hydraulic actuator.

19. A hydraulic system as defined in claim 1 wherein the hydraulic machine has only a single variable displacement hydraulic pump.

20. A hydraulic system including a hydraulic fluid and comprising:
a hydraulic machine for pressurizing the hydraulic fluid;
a hydraulic circuit for delivering the pressurized hydraulic fluid to a hydraulic actuator, the hydraulic machine being a variable displacement hydraulic pump configured to receive the pressurized hydraulic fluid from the hydraulic actuator; and
a kinetic energy storage device for storing energy in a kinetic form, wherein the kinetic energy storage device is a flywheel, the flywheel being operably coupled to the variable displacement hydraulic machine via a gear box such that the flywheel rotates faster than the variable displacement hydraulic machine;
the hydraulic system being configured such that the variable displacement hydraulic pump is operable to transfer energy from the pressurized hydraulic fluid received from the hydraulic actuator to the flywheel; and
the hydraulic machine further being arranged in the hydraulic system such that the hydraulic machine is directly coupled to the hydraulic actuator with no intervening pressure sources such that the hydraulic machine can route the pressurized hydraulic fluid directly to the hydraulic actuator and receive the pressurized hydraulic fluid back directly from the hydraulic actuator.

* * * * *